US012429889B2

(12) United States Patent
Ito et al.

(10) Patent No.: US 12,429,889 B2
(45) Date of Patent: Sep. 30, 2025

(54) CONVEYANCE OBJECT, CONVEYANCE OBJECT-COUPLING UNIT, AND CONVEYANCE SYSTEM

(71) Applicant: Preferred Robotics, Inc., Tokyo (JP)

(72) Inventors: Yoshito Ito, Tokyo (JP); Takahiro Yamana, Tokyo (JP); Toru Isobe, Tokyo (JP)

(73) Assignee: Preferred Robotics, Inc., Tokyo (JP)

( * ) Notice: Subject to any disclaimer, the term of this patent is extended or adjusted under 35 U.S.C. 154(b) by 144 days.

(21) Appl. No.: 18/425,478

(22) Filed: Jan. 29, 2024

(65) Prior Publication Data

US 2024/0255962 A1 Aug. 1, 2024

(30) Foreign Application Priority Data

Jan. 31, 2023 (JP) ................. 2023-012583

(51) Int. Cl.
*G05D 1/667* (2024.01)
*B66F 9/06* (2006.01)
(Continued)

(52) U.S. Cl.
CPC ............. *G05D 1/667* (2024.01); *B66F 9/063* (2013.01); *B66F 9/0755* (2013.01);
(Continued)

(58) Field of Classification Search
CPC .... G05D 1/667; G05D 1/242; G05D 2107/40; G05D 1/2446; G05D 1/661;
(Continued)

(56) References Cited

U.S. PATENT DOCUMENTS

2019/0278281 A1* 9/2019 Sakai ................. G07C 5/0816
2020/0324976 A1* 10/2020 Diehr ................. B65G 1/0492
(Continued)

FOREIGN PATENT DOCUMENTS

JP 2019-148881 9/2019
JP 2021-086205 6/2021
(Continued)

OTHER PUBLICATIONS

Asahi Kasei, corporate website, 2023.01.30 version, <URL:https://asahi-kasei-ces.com/>.
(Continued)

*Primary Examiner* — Brandon D Lee
(74) *Attorney, Agent, or Firm* — IPUSA, PLLC

(57) ABSTRACT

A conveyance object is configured to be coupled to an autonomous vehicle and conveyed by the autonomous vehicle to move. The conveyance object includes a bottom plate; a coupling provided on a lower surface of the bottom plate and configured to be coupled to the autonomous vehicle; a pair of guide frames provided on the lower surface and configured to guide the autonomous vehicle so as to move to a position of the coupling from a predetermined direction; and a pair of brackets provided to extend downward from the lower surface between the pair of guide frames and disposed on both sides of the coupling in the predetermined direction, each of the brackets being provided with a marking that faces the predetermined direction and that is recognizable by the autonomous vehicle.

20 Claims, 19 Drawing Sheets

(51) Int. Cl.

| | |
|---|---|
| *B66F 9/075* | (2006.01) |
| *G01S 7/481* | (2006.01) |
| *G01S 17/931* | (2020.01) |
| *G05D 1/242* | (2024.01) |
| *G05D 107/40* | (2024.01) |
| *G06K 7/14* | (2006.01) |

(52) U.S. Cl.
CPC .......... *G01S 7/4815* (2013.01); *G01S 17/931* (2020.01); *G05D 1/242* (2024.01); *G06K 7/1413* (2013.01); *G05D 2107/40* (2024.01)

(58) Field of Classification Search
CPC .......... G05D 2105/28; G05D 2109/10; G05D 2111/10; G05D 2111/17; B66F 9/063; B66F 9/0755; G01S 7/4815; G01S 17/931; G06K 7/1413
See application file for complete search history.

(56) References Cited

U.S. PATENT DOCUMENTS

| | | |
|---|---|---|
| 2023/0251668 A1 | 8/2023 | Yamana et al. |
| 2023/0259137 A1 | 8/2023 | Terada et al. |

FOREIGN PATENT DOCUMENTS

| | | |
|---|---|---|
| JP | 2022-144293 | 10/2022 |
| JP | 1753889 | 9/2023 |
| JP | 1755673 | 10/2023 |
| JP | 1756816 | 11/2023 |
| JP | 1756875 | 11/2023 |
| JP | 1757385 | 11/2023 |
| JP | 1757427 | 11/2023 |
| JP | 2023-184159 | 12/2023 |
| WO | 2022/085625 | 4/2022 |
| WO | 2022/085626 | 4/2022 |

OTHER PUBLICATIONS

Asahi Kasei, product introduction on corporate website, "Smart Cloak Gateway", Mar. 1, 2023 version, <URL:https://asahi-kasei-ces.com/products/smart-cloak-gateway/>.

Asahi Kasei, news on corporate website, "Proposal of future life using AI robot through CES 2023" dated Jan. 27, 2023, 2023.03.01 version, <URL:https://www.asahi-kasei.co.jp/j-koho/press/20230127/index/>.

PR Times, web article about Asahi Kasei Homes Corporation released on Jan. 27, 2023, "Proposal of future life using AI robot through CES 2023", 2023.01.28 version <URL:https://prtimes.jp/main/html/rd/p/000000061.000073738.html>.

Japanese Patent Application No. 2023-012586 filed on Jan. 31, 2023.

Japanese Patent Application No. 2023-012700 filed on Jan. 31, 2023.

Japanese Patent Application No. 2023-012584 filed on Jan. 31, 2023.

Japanese Patent Application No. 2023-012701 filed on Jan. 31, 2023.

Japanese Patent Application No. 2023-012585 filed on Jan. 31, 2023.

U.S. Appl. No. 18/425,461, filed Jan. 29, 2024.

* cited by examiner

FIG.16
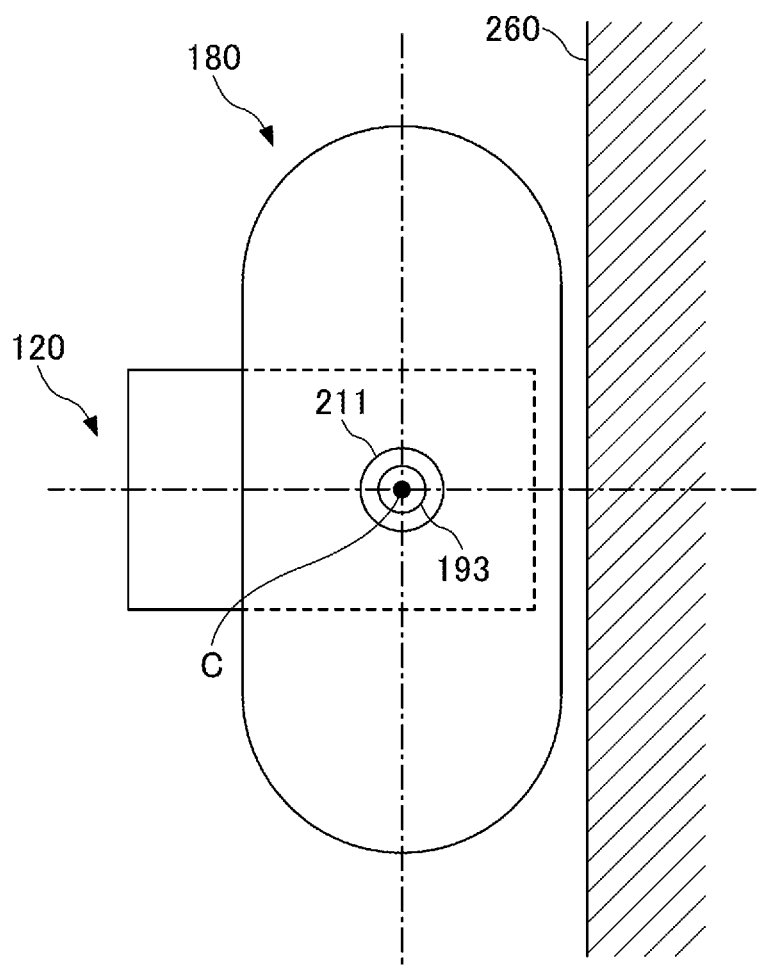
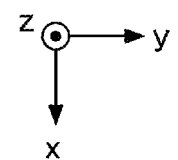

CONVEYANCE OBJECT, CONVEYANCE OBJECT-COUPLING UNIT, AND CONVEYANCE SYSTEM

CROSS-REFERENCE TO RELATED APPLICATIONS

This application is based on and claims priority to Japanese Patent Application No. 2023-012583, filed on Jan. 31, 2023, the entire contents of which are incorporated herein by reference.

BACKGROUND

1. Technical Field

The present disclosure relates to: conveyance objects, which are objects to be conveyed; conveyance object-coupling units; and conveyance systems.

2. Description of the Related Art

When autonomous vehicles, such as automatic guided vehicles and the like, are used in factories or ordinary homes, the autonomous vehicles may convey given conveyance objects, such as pieces of furniture, e.g., shelving units, towing trollies, and the like, on which objects are placed (see, for example, International Publication No. WO2022/085626).

A conceivable scenario in which conveyance objects are conveyed by autonomous vehicles is as follows. Specifically, for example, when a certain conveyance object is designated by a user as a conveyance target, an autonomous vehicle identifies the designated conveyance object by reading a marking provided to the conveyance object, such as a barcode for identification, using a camera-captured image or the like. Then, the autonomous vehicle couples the conveyance object to the autonomous vehicle and conveys the conveyance object.

When the autonomous vehicle is used in ordinary homes, the conveyance target can be mainly a piece of daily-use furniture, such as a shelving unit, a kitchen wagon, or the like. Therefore, as the marking for identification is provided to a noticeable site of furniture, such as the front surface thereof, the side surface thereof, or the like, the marking is readily in the user's sight in daily lives and may impair an appealing appearance of living spaces.

SUMMARY

A conveyance object according to one aspect of an embodiment of the present disclosure is configured to be coupled to an autonomous vehicle and conveyed by the autonomous vehicle to move. The conveyance object includes: a bottom plate; a coupling provided on a lower surface of the bottom plate and configured to be coupled to the autonomous vehicle; a pair of guide frames provided on the lower surface and configured to guide the autonomous vehicle so as to move to a position of the coupling from a predetermined direction; and a pair of brackets provided to extend downward from the lower surface between the pair of guide frames, provided in the predetermined direction with a marking recognizable by the autonomous vehicle, and disposed on both sides of the coupling in the predetermined direction.

BRIEF DESCRIPTION OF THE DRAWINGS

FIG. 16 is an explanatory schematic view for describing an advantage of the shelving unit having an oblong shape;

DETAILED DESCRIPTION

Embodiments will be described hereinafter with reference to the accompanying drawings. For the ease of understanding the description, throughout the drawings, the same components are given the same symbols to the extent possible, and duplicate description thereof will be omitted.

Note in the following description that, an x direction, a y direction, and a z direction are directions that are perpendicular to each other. The x direction and the y direction are horizontal directions, and the z direction is a vertical direction. The x direction is a width direction of an autonomous vehicle 120. The y direction is a front-rear direction of the autonomous vehicle 120. The z direction is a height direction of the autonomous vehicle 120. Also, for the sake of convenience in the following, a positive z-direction side may be referred to as an upper side, and a negative z-direction side may be referred to as a lower side.

<Scenario in which Autonomous Vehicle is Used>

Figure 1:
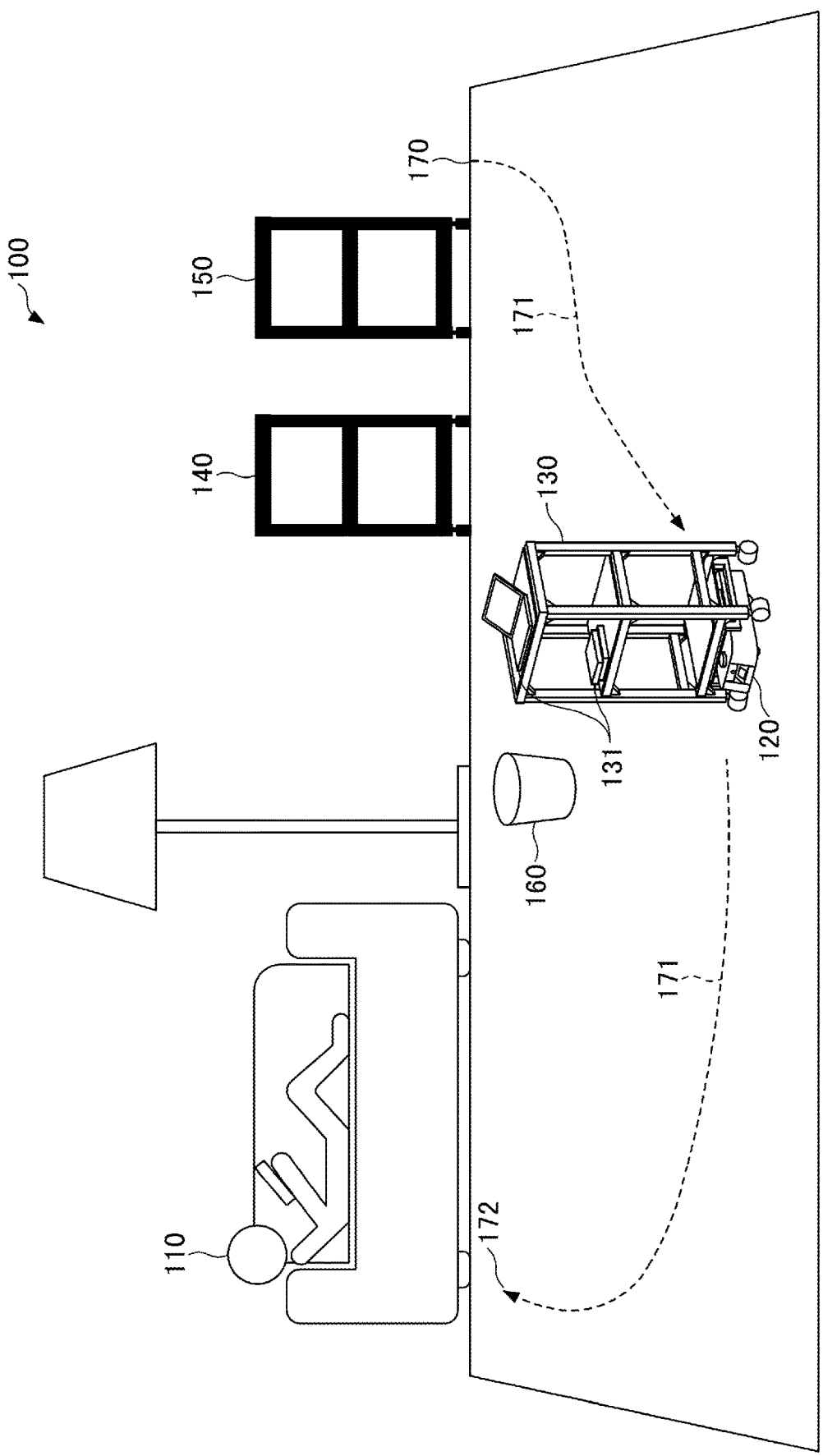
FIG. 1 illustrates an example of a scenario in which an autonomous vehicle is used.

First, a scenario in which an autonomous vehicle according to the embodiment is used will be described. FIG. 1 is a view illustrating an example of a scenario in which the autonomous vehicle is used, and illustrates a conveyance system including the autonomous vehicle 120 and a conveyance target thereof. As illustrated in FIG. 1, an autonomous vehicle 120 is used in, for example, a scenario where a user 110 is relaxing on a sofa in a predetermined space 100, such as a living room of a home. Also, for example, the autonomous vehicle 120 may be used in an office, a warehouse, a factory, or the like, in addition to the living room of the home.

The scenario in FIG. 1 illustrates a case where, for example, the user 110 has uttered a wake word and has subsequently uttered, "Bring me the laptop" to the autonomous vehicle 120 in order to use a laptop computer. In other words, FIG. 1 illustrates a case where a voice-based conveyance instruction (hereinafter may be referred to as a voice instruction) is performed. In this case, the autonomous vehicle 120 identifies, from among wheeled shelving units 130 to 150 equipped with wheels (hereinafter may be referred to as a caster), the shelving unit 130 that is conveying work tools 131, such as a laptop computer, books, and the like, and conveys the shelving unit 130 to a position near the user 110 upon docking with the shelving unit 130. Note that the autonomous vehicle 120 may be configured to follow a voice instruction that is given without a wake word.

Using the autonomous vehicle 120 in this manner allows the user 110 to simply give a voice instruction to bring a laptop computer that is in a remote location to be within grasping distance of the user. Thus, the user is able to obtain the laptop computer without having to move from the sofa.

Note that the example of FIG. 1 illustrates a case where the shelving unit 130 is standing by at the position of an anchor 170 in the predetermined space 100 at the point when the user 110 gave the voice instruction. Furthermore, the example of FIG. 1 illustrates a case where a trash can 160 is present as an obstacle on the shortest conveyance path used when the shelving unit 130, which is standing by at the position of the anchor 170, is conveyed to a position 172 near the user 110.

In such a case, the autonomous vehicle 120 detects the trash can 160 during conveyance of the shelving unit 130, and conveys the shelving unit 130 along a conveyance path that is indicated by a dotted arrow 171 to avoid collision with the trash can 160.

Further, although not illustrated in FIG. 1, assuming a case where, for example, after the autonomous vehicle 120 has conveyed the shelving unit 130 to the position 172 near the user 110 and the user 110 has taken the laptop computer out from the shelving unit 130, the user 110 gives a voice instruction to the autonomous vehicle 120 by uttering, "Return the shelving unit back to its original place." In this case, the autonomous vehicle 120 may convey the shelving unit 130 to the position of the anchor 170.

Further, although the example of FIG. 1 illustrated a case where the autonomous vehicle 120 conveys the shelving unit 130 as the conveyance target, the autonomous vehicle 120 may identify and convey the shelving unit 140 or the shelving unit 150 depending on the contents of the voice instruction given by the user 110. Furthermore, the example of FIG. 1 illustrated a case where the autonomous vehicle 120 identified a position near the user 110 as the conveyance destination position of the shelving unit 130. However, depending on the contents of the voice instruction given by the user 110, a position near a predetermined disposed object (for example, a piece of furniture) in the predetermined space 100 or a given position in the predetermined space 100 may be identified as the conveyance destination position of the shelving unit 130 by the autonomous vehicle 120.

<Configuration of Autonomous Vehicle>

Figure 2:
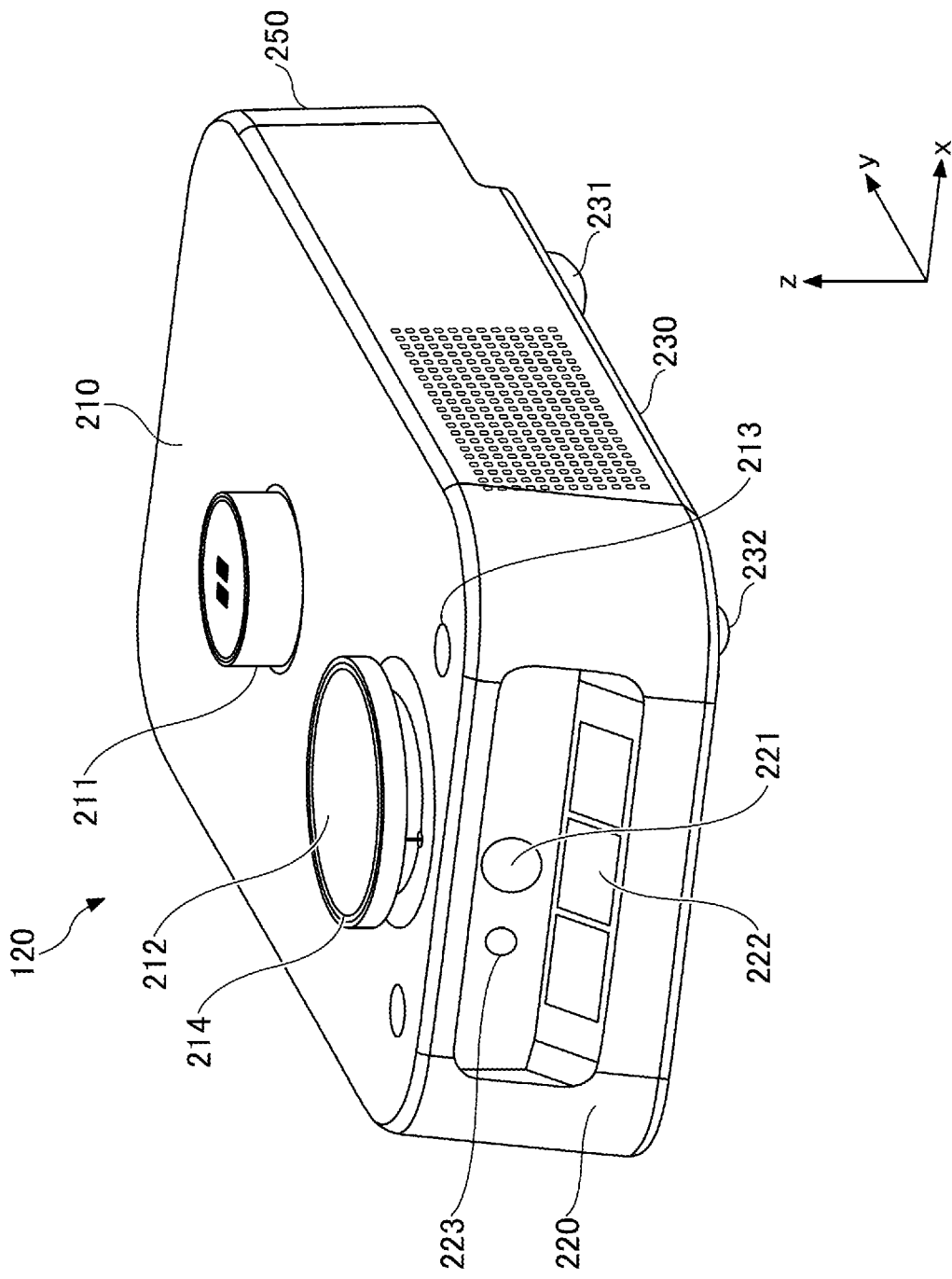
FIG. 2 is a perspective view illustrating an example of an external configuration of an autonomous vehicle according to an embodiment.
Figure 3:
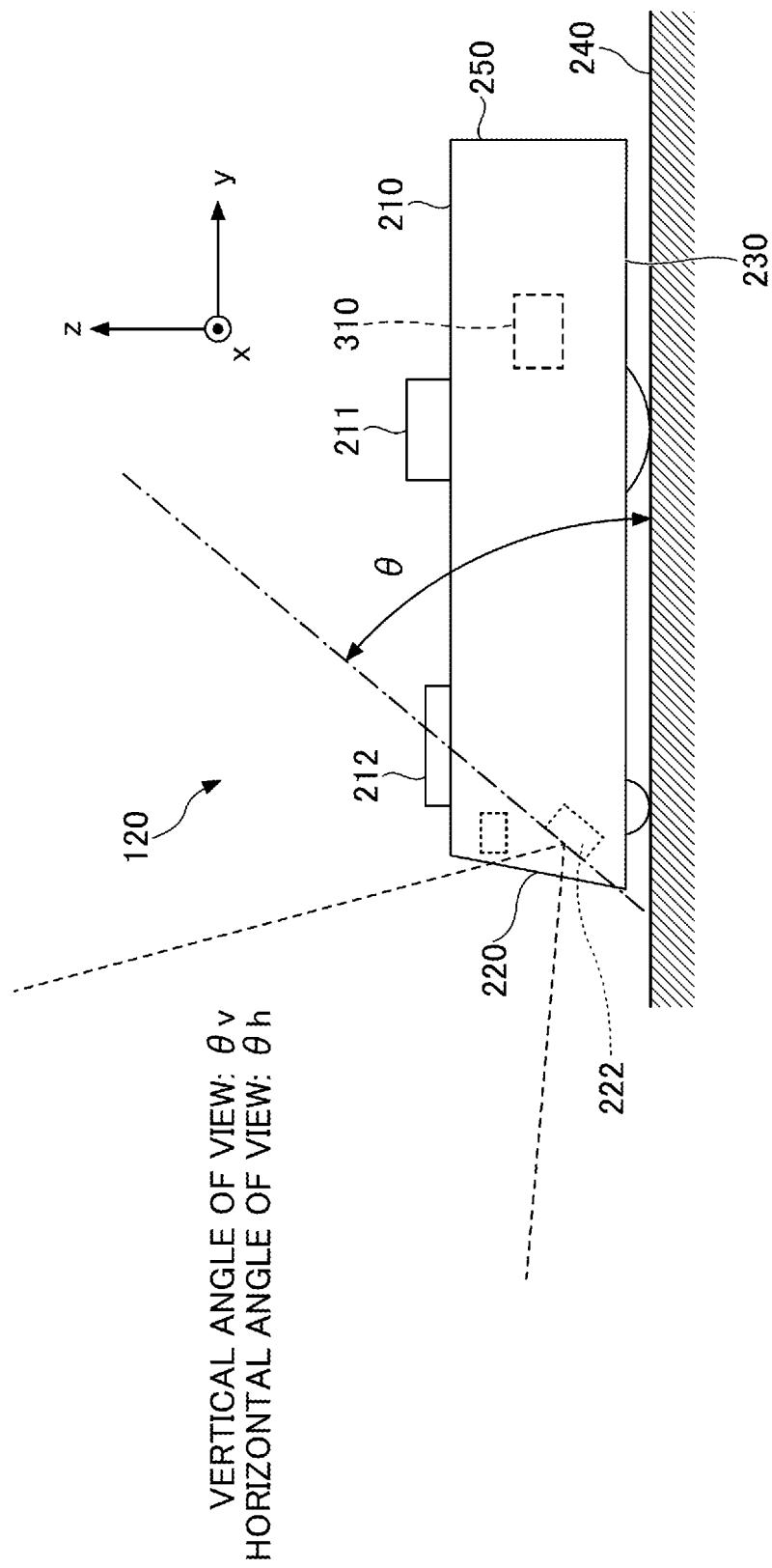
FIG. 3 is a side view illustrating an example of the external configuration of the autonomous vehicle according to the embodiment.
Figure 4:
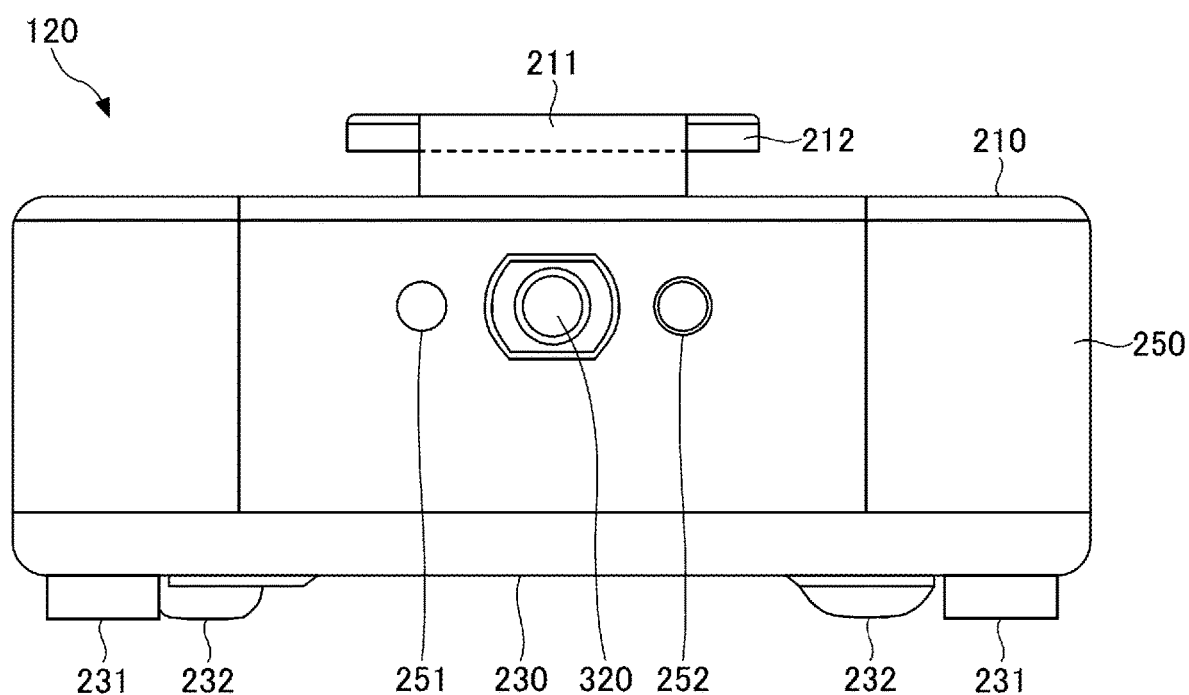
FIG. 4 is a rear view illustrating an example of the external configuration of the autonomous vehicle according to the embodiment.

The configuration of the autonomous vehicle 120 will be described next. FIG. 2 is a view illustrating an example of the external configuration of the autonomous vehicle 120 according to the embodiment. FIG. 3 is a side view of an example of the external configuration of the autonomous vehicle 120 according to the embodiment as viewed from the positive x-direction side. FIG. 4 is a rear view of an example of the external configuration of the autonomous vehicle 120 according to the embodiment as viewed from the positive y-direction side.

As illustrated in FIG. 2, the autonomous vehicle 120 has a rectangular cuboid shape as a whole, and its dimensions in a height direction (z-axis direction) and a width direction (x-axis direction) are defined so as to allow the autonomous vehicle 120 to enter below the bottom shelf (the bottom) of a conveyance-target shelving unit. Note that the shape of the autonomous vehicle 120 is not limited to a rectangular cuboid.

A locking device 211 (coupling), which is a component of a docking mechanism used to dock with the conveyance-target shelving unit, may be disposed on an upper surface 210 of the autonomous vehicle 120. For example, a laser imaging detection and ranging (LIDAR) device 212 is also disposed on the upper surface 210 of the autonomous vehicle 120. The measurement range of the LIDAR device 212 may cover the front-rear direction (y-axis direction) and the width direction (x-axis direction) at a position equal in height to the upper surface 210 of the autonomous vehicle 120. An obstacle or the like that is present in the measurement range can be detected by using the measurement result of the LIDAR device 212.

A front RGB camera 221, a time-of-flight camera (ToF camera) 222, and the like may be disposed at a front surface 220 of the autonomous vehicle 120. Note that although the front RGB camera 221 of the present embodiment is disposed on the upper side with respect to the ToF camera 222, the disposition position of the front RGB camera 221 is not limited to this position. The front RGB camera 221 may be disposed on the lower side of the ToF camera 222, or the front RGB camera 221 and the ToF camera 222 may be disposed side by side.

When the autonomous vehicle 120 moves in the forward direction, the front RGB camera 221 captures and outputs color images of, for example, a shelving unit (for example, the shelving unit 130) that is to be the conveyance target, a user (for example, the user 110) who is near the conveyance destination, a disposed object that is near the conveyance destination, an obstacle (for example, the trash can 160) on the conveyance path, and the like.

The ToF camera 222 is an example of a sensor configured to obtain three-dimensional position-related measurement data for identifying the three-dimensional position of an object within a measurement range, i.e., the positions of the autonomous vehicle 120 in the width direction, the front-rear direction, and the height direction. In order to avoid multipath interference, the ToF camera 222 is disposed facing upward on the front surface 220 of the autonomous vehicle 120 to an extent that the surface (a floor 240 illustrated in FIG. 3) on which the autonomous vehicle 120 travels is not included in the measurement range. An example of multipath interference is a state in which light emitted from a light source is reflected by another target object via the floor 240 and a reduction in measurement accuracy is caused due to the ToF camera 222 receiving the reflected light. In the present embodiment, an upward disposition angle θ of the ToF camera 222 on the front surface 220 of the autonomous vehicle 120 is approximately 50 degrees with respect to the floor 240.

Further, when the autonomous vehicle 120 moves in the forward direction, the ToF camera 222 may capture a range image (depth image) of an obstacle or the like by setting at least an area to be passed by the docked shelving unit (that is, an area corresponding to the height of the docked shelving unit×the width of the docked shelving unit) as the measurement range. The ToF camera 222 may output the captured range image (depth image) as three-dimensional positional data. Note that in the present embodiment, the ToF camera 222 have a vertical angle of view θv of 70 degrees and a horizontal angle of view θh of 90 degrees. A stereo camera or a monocular camera may be used instead of the ToF camera 222 as a sensor device to obtain the three-dimensional positional data of an object. In the case of a stereo camera, the three-dimensional positional data within the measurement range can be calculated from two images captured at the same timing. In the case of a monocular camera, the three-dimensional positional data within the measurement range can be calculated from two images captured at different timings, the direction of movement of the autonomous vehicle 120, and the distance moved by the autonomous vehicle 120.

A lighting mechanism 223 is disposed near the front RGB camera 221 on the front surface 220 of the autonomous vehicle 120. The lighting mechanism 223 may be turned on upon the start of docking with the conveyance target, and may be turned off upon completion of docking with the conveyance target. The lighting mechanism 223 is, for example, a light-emitting diode (LED). By being turned on during driving of the front RGB camera 221, the lighting mechanism 223 emits light to a capture target of the front RGB camera 221, and can allow an image captured by the front RGB camera 221 to become clearer, and increase accuracy of object recognition performed using the captured image.

The drive wheel 231 and the non-drive wheel 232 may be disposed on the lower surface 230 of the autonomous vehicle 120, thereby supporting the autonomous vehicle 120.

The drive wheel 231 is disposed at both sides in the width direction (x-axis direction) (e.g., a total of two drive wheels 231 are disposed in the width direction). When the drive wheels 231 are each independently motor-driven, the drive wheels 231 may cause the autonomous vehicle 120 to move in a travelling direction, i.e., a forward and rearward direction (y-axis direction). The drive wheels 231 may also cause the autonomous vehicle 120 to turn about the z axis.

The non-drive wheel 232 may be provided on each side in the width direction (x-axis direction) (that is, a total of two non-drive wheels may be provided along the width direction). Each of the non-drive wheels 232 may also be provided to be able to turn about the z axis with respect to the autonomous vehicle 120. Note that the disposition positions and number of non-drive wheels 232 may be other than those described above.

As illustrated in FIG. 3, a controller 310 is mounted in the interior of the autonomous vehicle 120. The controller 310 controls movements of the drive wheel 231 and the locking device 211 based on information input from various sensors mounted in the autonomous vehicle 120, operation commands received from the exterior, and the like, thereby controlling the movement of the autonomous vehicle 120 and the coupling to the shelving unit 130. Note that the coupling between two objects in the present disclosure may refer to a relationship in which one object moves and the other object also moves in association therewith regardless of whether or not the two objects are in contact with each other.

As illustrated in FIG. 4, a rear RGB camera 320 may be disposed on a rear surface 250 of the autonomous vehicle 120.

When the autonomous vehicle 120 moves in the backward direction, the rear RGB camera 320 may capture and output color images of, for example, the conveyance-target shelving unit (for example, the shelving unit 130), an obstacle in the periphery of the conveyance-target shelving unit, and the like.

A lighting mechanism 251 is disposed near the rear RGB camera 320 on the rear surface 250 of the autonomous vehicle 120. The lighting mechanism 251 may be turned on upon the start of docking with the conveyance target, and may be turned off upon completion of docking with the conveyance target. The lighting mechanism 251 is, for example, a LED. By being turned on during driving of the rear RGB camera 320, the lighting mechanism 251 emits light to a capture target of the rear RGB camera 320, and can allow an image captured by the rear RGB camera 320 to become clearer, and increase accuracy of object recognition performed using the captured image.

A power switch 213 may also be provided on the upper surface 210 of the autonomous vehicle 120. For example, the power switch 213 is pressed by a user of the autonomous vehicle 120, and starts up the controller 310, thereby starting up the autonomous vehicle 120 to be drivable. When the power switch 213 is pressed during driving of the autonomous vehicle 120, it is possible to stop the controller 310 and hence stop the autonomous vehicle 120. Note that the power switch 213 is preferably disposed near the front end of the upper surface 210. Thereby, even in a state in which the autonomous vehicle 120 is coupled to the conveyance-target shelving unit 130, the power switch 213 is exposed forward of the shelving unit 130, and this readily enables switching (see FIG. 5B).

A user switch 252 may also be provided on the rear surface 250 of the autonomous vehicle 120. The user switch 252 can be set so that a user of the autonomous vehicle 120 can input a given command for driving.

The LIDAR device 212, provided at the upper surface 210 of the autonomous vehicle 120, may be formed into an approximately columnar shape as illustrated in FIG. 2. A light source 214 may be annularly disposed so as to be along the outer periphery of the upper surface of the columnar shape of the LIDAR device 212. The light source 214 is, for example, formed of a plurality of LEDs that are annularly disposed. The light source 214 can emit light of multiple colors. For example, by changing the color of emitted light in accordance with a drive state of the autonomous vehicle 120, it is possible to notify the surroundings of the drive state of the autonomous vehicle 120.

<Outline of Docking>

Figure 5A:
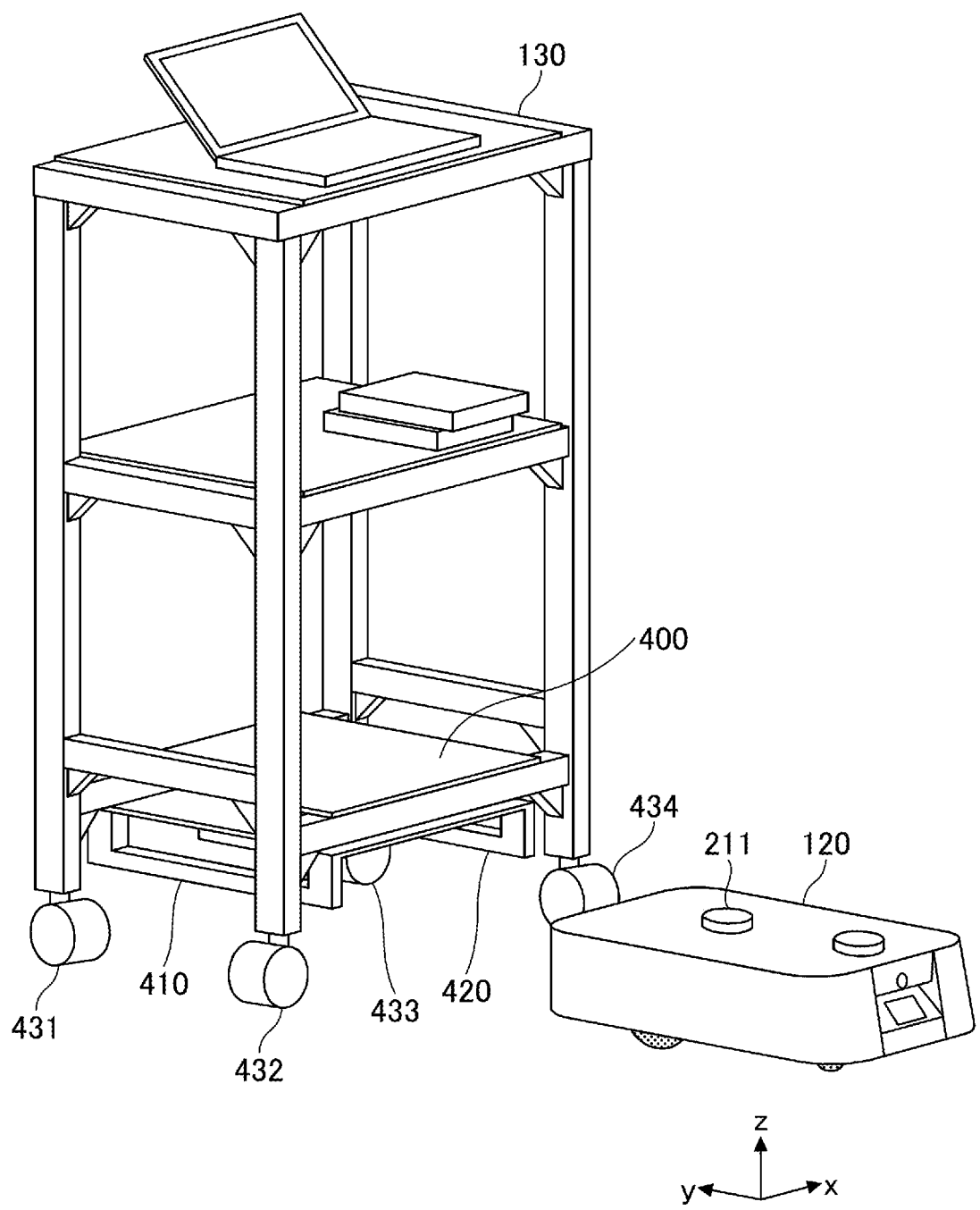
FIGS. 5A and 5B are views illustrating a state in which the autonomous vehicle is docked with a conveyance-target shelving unit.
Figure 5B:
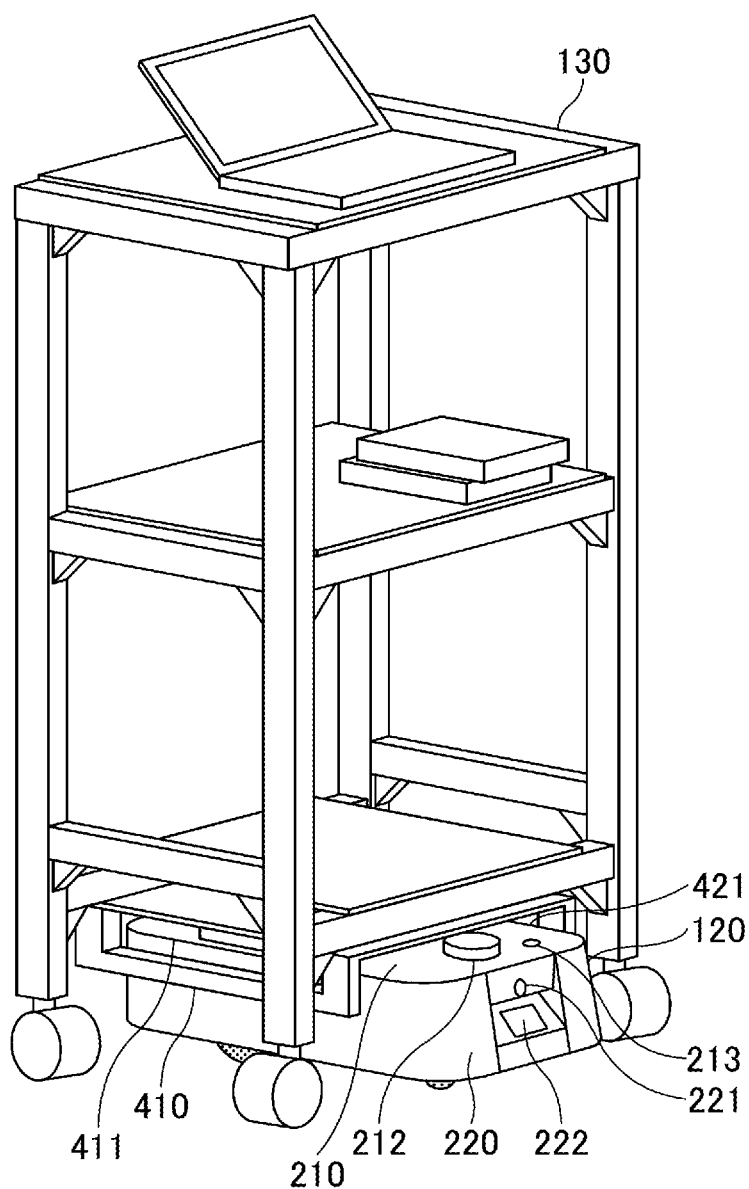

The outline of the docking will be described next. FIGS. 5A and 5B are views illustrating a state in which the autonomous vehicle is docked with the conveyance-target shelving unit 130. Note that the same applies to the shelving units 140 and 150. FIGS. 5A and 5B are views for mainly describing the outline of docking, and illustrate the shelving unit 130 that is an example of the conveyance target illustrated in FIG. 1, which illustrates a general scene in which the autonomous vehicle and the conveyance-target shelving unit are used. A shelving unit 180 that is the conveyance object according to the present embodiment will be described about a specific configuration thereof with reference to FIG. 9 and subsequent drawings.

FIG. 5A is a view illustrating a state immediately before the autonomous vehicle 120 is docked with the conveyance-target shelving unit 130 that is standing by at the position of the anchor 170.

As illustrated in FIG. 5A, the shelving unit 130 may include three shelves. Frame guides 410 and 420 may be attached on the underside of a bottom shelf 400 so as to be substantially parallel to each other with a space corresponding to the width of the autonomous vehicle 120 provided therebetween. This configuration can define the entry direction when the autonomous vehicle 120 is to enter below the bottom shelf 400 of the conveyance-target shelving unit 130. Further, the frame guides 410 and 420 may function as guides in the width direction when the autonomous vehicle 120 is to convey the conveyance-target shelving unit 130, thereby preventing the shelving unit 130 from shifting in the width direction relative to the autonomous vehicle 120. Note that the autonomous vehicle 120 may move forward toward the conveyance-target shelving unit 130 and be docked with the shelving unit 130.

In addition, casters 431 to 434 may be rotatably attached to the feet of the shelving unit 130. Such a configuration can allow the autonomous vehicle 120 to readily convey the docked shelving unit 130.

FIG. 5B illustrates a state after the autonomous vehicle 120 is docked with the conveyance-target shelving unit 130. As illustrated in FIG. 5B, even when the autonomous vehicle 120 is docked with the shelving unit 130, the front surface 220 of the autonomous vehicle 120 is not obstructed by the shelves of the shelving unit 130. In other words, the front surface 220 may project further in the forward direction relative to the shelves of the shelving unit 130. In the example of FIG. 5B, therefore, when the autonomous vehicle 120 is to convey the shelving unit 130, the measurement range of the front RGB camera 221 is not obstructed by one of the shelves of the shelving unit 130. However, it is possible to make a specification that when the autonomous vehicle 120 is to convey the shelving unit 130, the measurement range of the front RGB camera 221 is obstructed by one of the shelves of the shelving unit 130.

In a similar manner, when the autonomous vehicle 120 is to convey the shelving unit 130, the measurement range (the vertical angle of view θv and the horizontal angle of view θh) of the ToF camera 222 is not obstructed by one of the shelves of the shelving unit 130. However, it is possible to make a specification that when the autonomous vehicle 120 is to convey the shelving unit 130, the measurement range (the vertical angle of view θv and the horizontal angle of view θh) of the ToF camera 222 is obstructed by one of the shelves of the shelving unit 130.

When the autonomous vehicle 120 is docked with the shelving unit 130, the front and rear measurement ranges of the LIDAR device 212 at the height position of the autonomous vehicle 120 are not obstructed. However, there is a possibility that the frame guides 410 and 420 may obstruct the measurement range of the LIDAR device 212 in the width direction.

Therefore, the frame guides 410 and 420 of the shelving unit 130 can include openings 411 and 421, respectively, to reduce the extent to which the measurement ranges of the LIDAR device 212 in the width direction that may be obstructed. Thereby, when the autonomous vehicle 120 is to convey the shelving unit 130, the LIDAR device 212 can measure the measurement ranges in the front, rear, and width directions at the height position of the autonomous vehicle 120 without being obstructed by the shelving unit 130. However, it is possible to make a specification that when the autonomous vehicle 120 is to convey the shelving unit 130, the measurement ranges of the LIDAR device 212 in the front, rear, and width directions at the height position of the autonomous vehicle 120 are obstructed by the shelving unit 130.

Note that although not illustrated in FIG. 5B, microphones 301 and 302 (see FIG. 10), disposed on the front-surface side of the autonomous vehicle 120, may be disposed at positions projecting in the forward direction from the shelves of the shelving unit 130 in a state in which the autonomous vehicle 120 is docked with the shelving unit 130. Thereby, when the autonomous vehicle 120 is to convey the shelving unit 130, the detection range of the microphones 301 and 302 on the front-surface side is not obstructed by one of the shelves of the shelving unit 130. However, it is possible to make a specification that when the autonomous vehicle 120 is to convey the shelving unit 130, the detection range of the microphones 301 and 302 on the front-surface side is obstructed by one of the shelves of the shelving unit 130.

Figure 6:
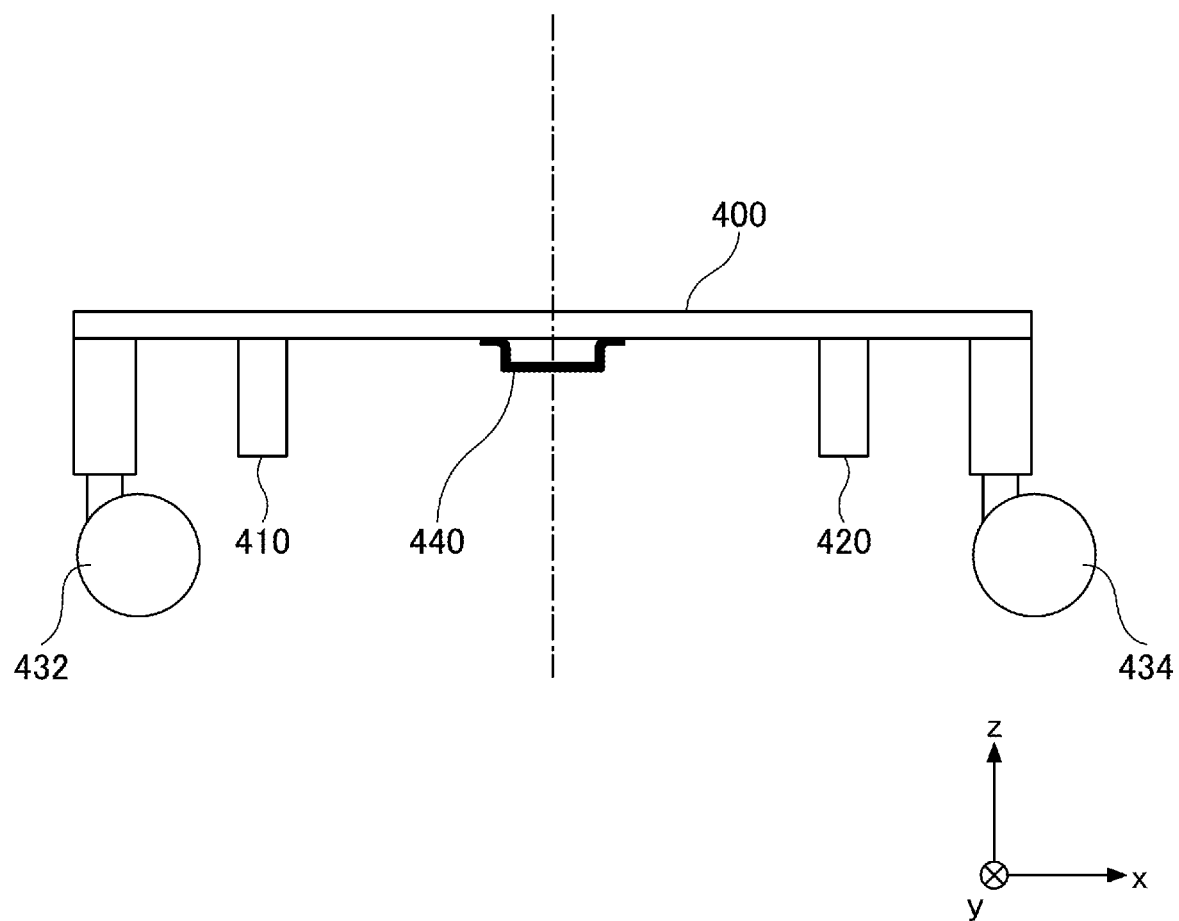
FIG. 6 is a front view illustrating a schematic configuration below a bottom shelf of the shelving unit.

FIG. 6 is a front view illustrating a schematic configuration below the bottom shelf 400 of the shelving unit 130. As illustrated in FIG. 6, a projection 440 is provided at the middle position between the pair of frame guides 410 and 420, i.e., the center position of the bottom shelf 400 of the shelving unit 130 in the x direction, so as to project downward from the lower surface of the bottom shelf 400. In the present embodiment, the projection 440 has, for example, a columnar shape, but is not limited to this shape.

The above-described locking device 211 of the autonomous vehicle 120 may be configured to be movable upward and downward. The locking device 211 is raised and mated with the projection 440, thereby coupling the autonomous vehicle 120 and the shelving unit 130 to each other. That is, the locking device 211 of the autonomous vehicle 120 and the projection 440 of the shelving unit 130 (the conveyance target) form a "coupling structure between the autonomous vehicle and the conveyance target" according to the present embodiment.

The locking device 211 functions as a "regulator provided in the autonomous vehicle 120 and movable upward and downward, and moved upward and mated with the projection 440, thereby regulating a relative movement of the projection 440 at least in the forward and rearward direction of the autonomous vehicle 120". In the present embodiment, the locking device 211 serving as the regulator is a recess to be mated with the projection 440, and may be an engagement to be engaged with the projection 440 so as to sandwich the projection 440 at least between the front and the rear in the travelling direction of the autonomous vehicle 120. When the recess of the locking device 211 is moved upward and mated with the projection 440 (houses at least a part of the projection 440), the recess of the locking device 211 regulates a relative movement in the horizontal direction of the projection 440, i.e., the conveyance target, with respect to the autonomous vehicle 120, thereby creating a state in which the autonomous vehicle 120 can tow the conveyance target.

The term "mating" used in the present embodiment is an example of "engagement" and is included in the concept of "engagement". The "mating" generally means a relationship in which various parts of a machine are fitted to each other, like a shaft and a bearing. The "mating" means, for example, relationships in which a shaft is firmly fitted to a recess, such as a hole, and a shaft is loosely fitted to a recess, such as a hole, so as to be slidable. In the present embodiment, the "mating" means that the projection 440 having a projecting shape and the locking device 211 having a recessed shape are fitted to each other, and the outer surface of the projection 440 is completely covered by the locking device 211.

Also, the term "engagement" means that a plurality of elements is engaged with each other, and is an expression that is generally used, for example, to express power transmission between gears. In the present embodiment, the "engagement" refers to a coupling relationship between the locking device 211 and the projection 440, in which by movement of the autonomous vehicle 120, the locking device 211, having a recessed shape and provided in the autonomous vehicle 120, at least temporarily contacts the projection 440, provided in the shelving unit 130 and having a projecting shape, so that a driving force of the autonomous vehicle 120 can be transmitted from the locking device 211 to the projection 440. A type of engagement other than mating is, for example, a configuration in which the projection 440 having a projecting shape is held by a plurality of plates, bars, or the like. Alternatively, in an engagement relationship, a plurality of elements is not necessarily in contact with each other, and may be in no contact with each other as long as a driving force can be transmitted. For example, an attractive or repulsive force may be caused to occur between elements utilizing an electromagnet or the like, and such an attractive or repulsive force may be used for transmission of a power between the elements.

The locking device 211 of the autonomous vehicle 120 can also be expressed as a "coupling that can be coupled to the shelving units 130 to 150 of the conveyance target".

In the present embodiment, the locking device 211 is formed to have a cylindrical shape with which the columnar projection 440 of the shelving unit 130 can be mated. The locking device 211 may have an annular shape other than a shape of a true circle, such as an oval shape, an oblong shape, or the like, as long as the locking device 211 can house at least the projection 440 in the interior thereof.

<Details of Configurations of Interior and Lower Surface of the Autonomous Vehicle>

Figure 7:
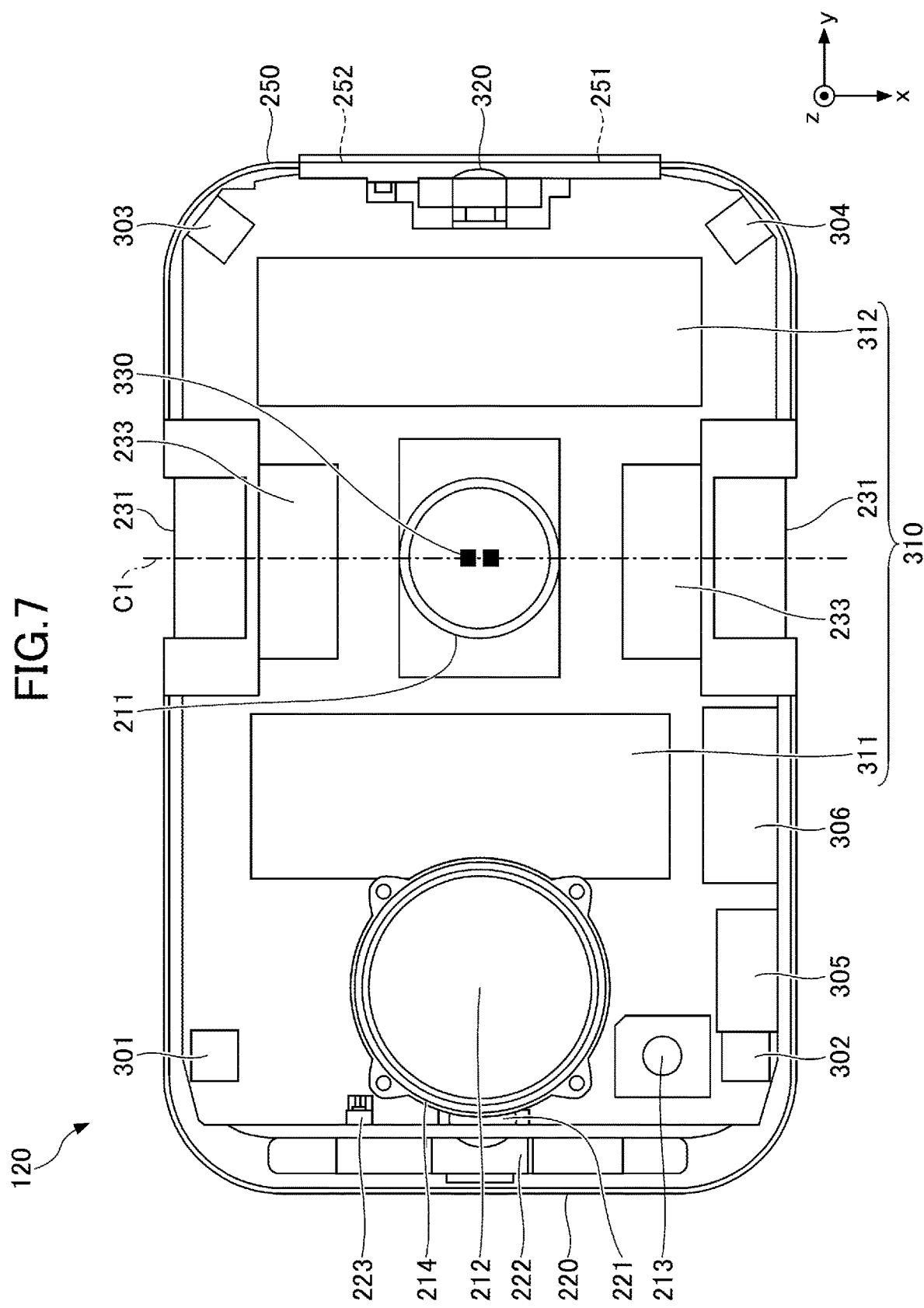
FIG. 7 is a plan view illustrating an internal structure of the autonomous vehicle according to the embodiment as viewed from above.
Figure 8:
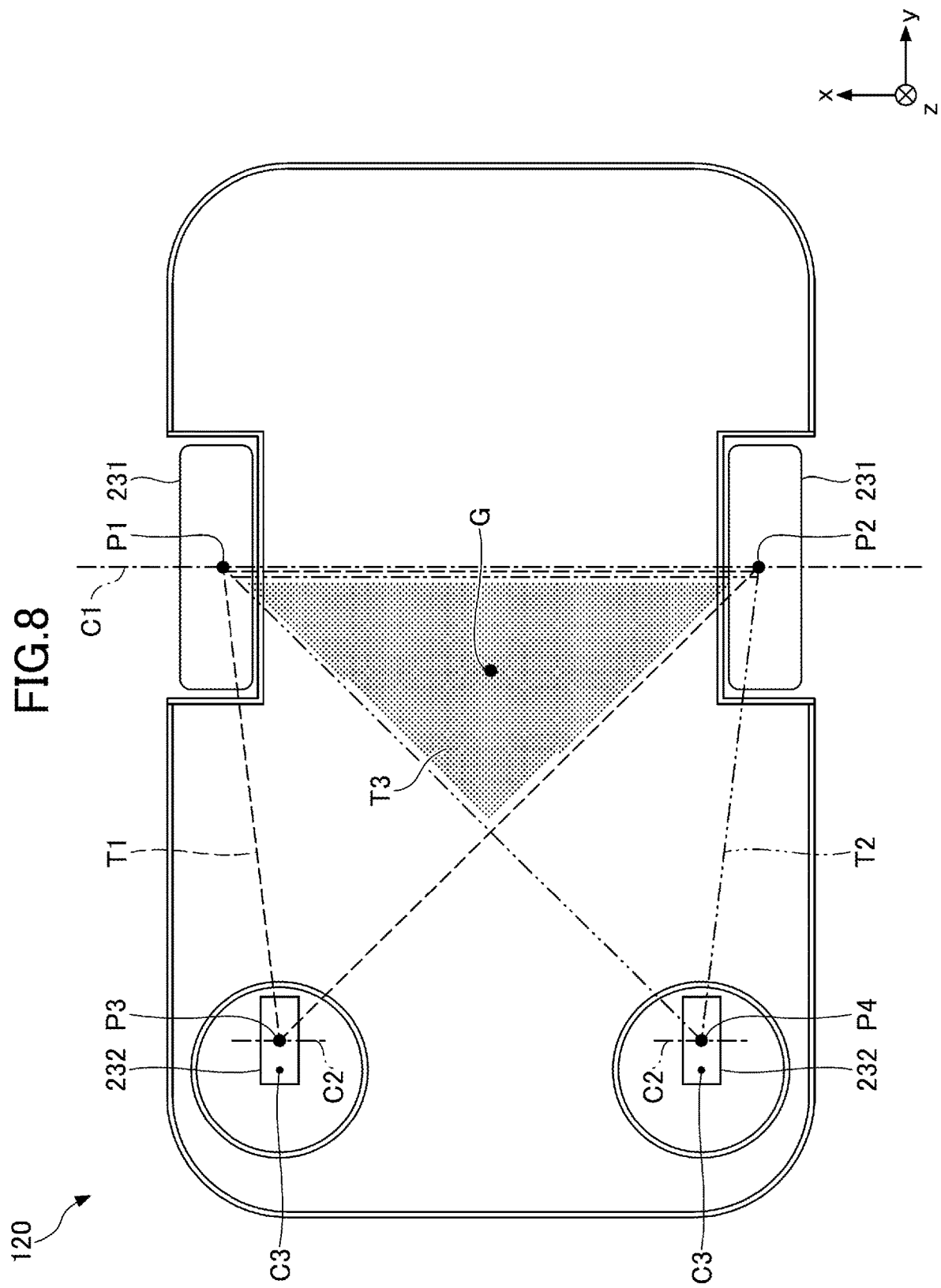
FIG. 8 is a plan view of the autonomous vehicle according to the embodiment as viewed from below.

Details of the configurations of the interior and the lower surface of the autonomous vehicle will be described next. FIG. 7 is a plan view illustrating the internal structure of the autonomous vehicle 120 according to the embodiment as viewed from above. FIG. 8 is a plan view of the autonomous vehicle 120 according to the embodiment as viewed from below, and is for describing the position of the center of gravity. FIG. 7 illustrates the state as viewed directly above, with the upper cover of the autonomous vehicle 120 being removed.

(a-1) First Control Circuit Board and Second Control Circuit Board

The first control circuit board and the second control circuit board will be described first. As illustrated in FIG. 7 and FIG. 8, the autonomous vehicle 120 may include a first control circuit board 311 and a second control circuit board 312. In the present embodiment, the first control circuit board 311 controls, for example, electronic devices, and the second control circuit board 312 controls, for example, drive devices. Note that, however, the division of the roles of the first control circuit board 311 and the second control circuit board 312 is not limited to this.

Note that the example of FIG. 7 and FIG. 8 illustrates a case where the first control circuit board 311 and the second control circuit board 312 are provided separately. However, the first control circuit board 311 and the second control circuit board 312 may also be provided integrally as a single circuit board. Regardless of whether the first control circuit board 311 and the second control circuit board 312 are disposed separately or integrally, a device having both of the functions of the first control circuit board 311 and the functions of the second control circuit board 312 is referred to as the controller 310 in the present embodiment.

(a-2) Docking Mechanism

The docking mechanism will be described next. As illustrated in FIG. 7, the autonomous vehicle 120 may include the solenoid locking device 211 and a photoreflector 330 as a docking mechanism for docking with a shelving unit that is to be the conveyance target. Note that although the docking mechanism according to the present embodiment may use a solenoid locking device 211, the raising and lowering of the locking device 211 may be performed by an electromagnetic actuator other than a solenoid or by another type of actuator, such as a rack and pinion mechanism, a trapezoidal thread mechanism, or a pneumatic drive mechanism.

In the present embodiment, the drive wheels 231 are provided such that one drive wheel is on each side in the width direction (x direction) of the body of the autonomous vehicle 120, and the solenoid locking device 211 may be provided at the center position of the drive wheels 231 in the width direction (x-axis direction), so as to be on the rotational axis C1 of the drive wheels 231 (see the chain line in FIG. 8).

As illustrated in FIG. 7, the solenoid locking device 211 may include an unillustrated compression coil spring. When an unillustrated solenoid is turned on, an unillustrated movable part housed in the solenoid is attracted downward, and the locking device that is coupled to the upper part of the movable part is also attracted downward, causing the compression coil spring to contract. When the solenoid is turned off, the solenoid locking device projects upward (that is, toward the front side of the drawing in the case of FIG. 7) by the compression force of the compression coil spring. Note that the controller 310 may control the solenoid to be turned on or off.

The photoreflector 330 may output a signal to determine whether or not the locking device 211 can be projected toward the projection 440 attached to a conveyance-target shelving unit when the autonomous vehicle 120 enters below the bottom shelf of the conveyance-target shelving unit.

The autonomous vehicle 120 may turn off the solenoid when it is determined, based on the signal output from the photoreflector 330, that the locking device 211 can be projected. Note that although the photoreflector 330 is used to detect the state in which the locking device 211 and the projection 440 are facing each other in the present embodiment, the detection may be performed by a method using a component other than the photoreflector. A method using a component other than the photoreflector is, for example, a method using a camera, a physical switch, a magnetic sensor, an ultrasonic sensor, or the like.

Consequently, the locking device 211 can project toward the projection 440, and the projected locking device 211 can be inserted into the projection 440. As a result, the docking of the autonomous vehicle 120 with the conveyance-target shelving unit can be completed.

Note that, as described above, the drive wheels are provided such that one drive wheel is on each side in the width direction (x direction) of the body of the autonomous vehicle 120, and the solenoid locking device 211 may be provided at the center position of the drive wheels 231 in the width direction (x direction). In other words, the solenoid locking device 211 may be provided symmetrically in the width direction. Thereby, when entering below the bottom shelf of the conveyance-target shelving unit, the autonomous vehicle 120 can enter in a forward direction or in a backward direction.

When the solenoid is turned on to attract the locking device 211 in a state in which the autonomous vehicle 120 is docked with the conveyance-target shelving unit, the autonomous vehicle 120 can be undocked from the conveyance-target shelving unit.

(a-3) Various Input and Output Devices

Various input and output devices will be described next. As illustrated in FIG. 7, in addition to the LIDAR device 212, the front RGB camera 221, the ToF camera 222, and the rear RGB camera 320 that are described above, the autonomous vehicle 120 may include various types of input and output devices, such as microphones 301 to 304 and a loudspeaker 305.

As the disposition positions, the disposition directions, the measurement ranges, the measurement targets, and the like of the LIDAR device 212, the front RGB camera 221, the ToF camera 222, and the rear RGB camera 320 have already been described, description thereof will be omitted here.

The microphones 301 to 304 are examples of audio input devices. The microphones 301 to 304 may be provided at the four corners (two on the front side and two on the rear side) of the autonomous vehicle 120 to detect sound from the respective directions. By providing the microphones 301 to 304 at the four corners of the autonomous vehicle 120 in this manner, the direction in which the user 110 who gave the voice instruction is present can be determined with respect to the current position and orientation of the autonomous vehicle 120, thus allowing estimation of the position of the user 110.

The loudspeaker 305 is an example of an audio output device, and may provide a voice output in the lateral direction of the autonomous vehicle 120. The loudspeaker 305 may provide, for example, a voice output to confirm the contents of a task recognized by the autonomous vehicle 120 in response to a voice instruction from the user 110. As illustrated in FIG. 7, the loudspeaker 305 may be disposed, for example, near the lateral surface on the positive x-direction side of the body of the autonomous vehicle 120. Note that although the autonomous vehicle 120 includes the single loudspeaker 305 in the present embodiment, the autonomous vehicle 120 may include two or more loudspeakers.

A fan 306 may be provided in the interior of the autonomous vehicle 120. For example, the fan 306 may be disposed, for example, next to the first control circuit board 311 that releases a large quantity of heat, thereby cooling the first control circuit board 311. That is, the fan 306 may be disposed at a position closer to the first control circuit board 311 than to the second control circuit board 312. In the example of FIG. 7, the fan 306 is disposed next to the loudspeaker 305 near the lateral surface on the positive x-direction side of the body of the autonomous vehicle 120.

(b-1) Drive Wheels

Figure 9:
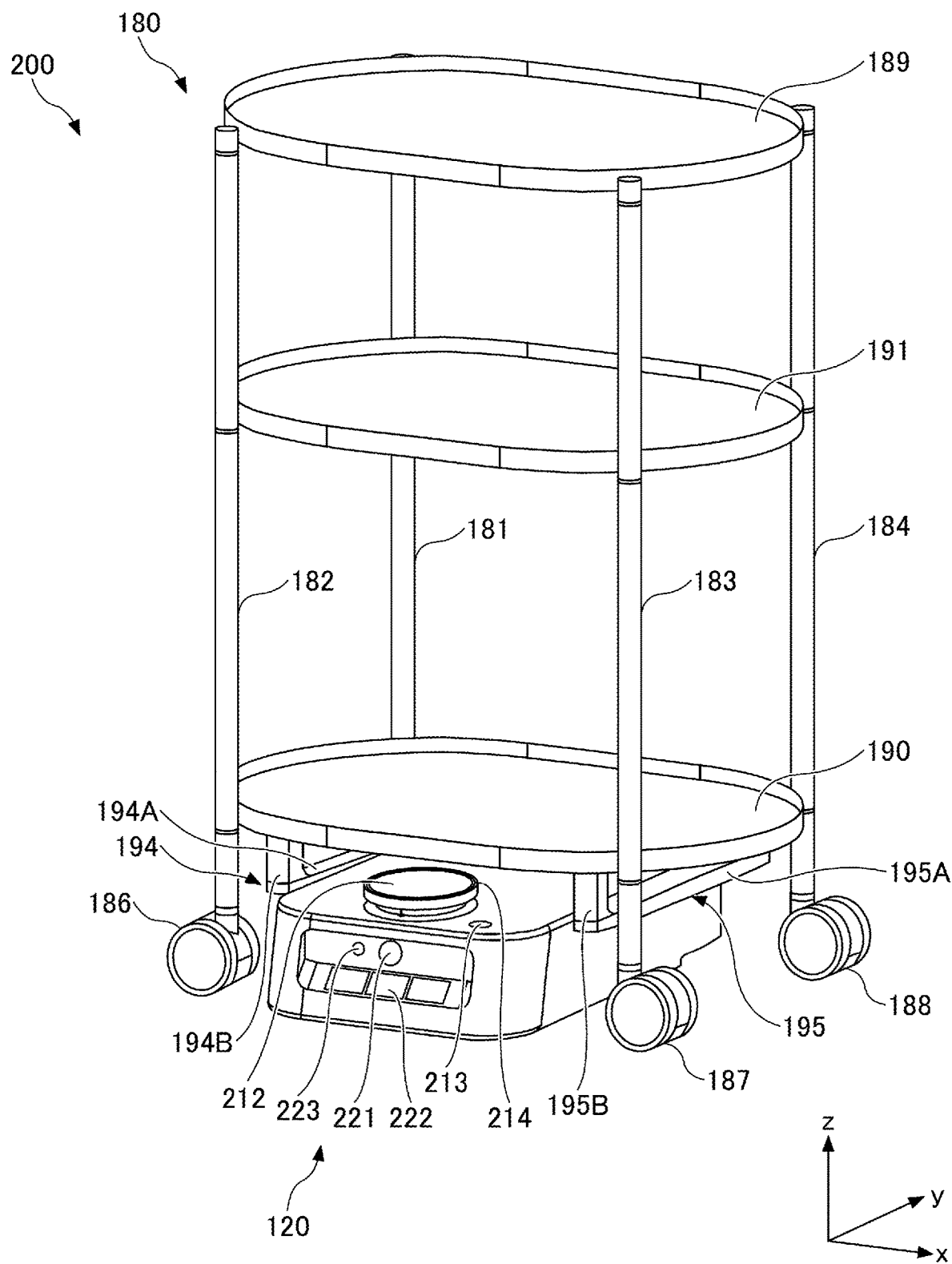
FIG. 9 is a perspective view illustrating a schematic configuration of a conveyance system according to the embodiment.

As illustrated in FIG. 8 and FIG. 9, the autonomous vehicle 120 may include the drive wheels 231 that are provided such that one drive wheel is present on each side in the width direction (x direction) of the body of the autonomous vehicle 120. As described above, the drive wheel 231 may be each independently motor-driven to move the autonomous vehicle 120 in the forward-backward direction (y direction) and to cause the autonomous vehicle 120 to turn about the z axis.

Specifically, the autonomous vehicle 120 can be moved in the forward direction by rotating both of the drive wheels 231 forward, and the autonomous vehicle 120 can be moved in the backward direction by reversing both of the drive wheels 231. Further, the autonomous vehicle 120 can turn by rotating one of the drive wheels 231 forward and rotating the other in reverse.

Note that as described above, the rotational axis of one of the drive wheels 231 and the rotational axis of the other may be formed on a common axis C1 (rotational axis C1), and the solenoid locking device 211 may be provided on the common axis C1 at the center position between one drive wheel 231 and the other drive wheel 231. Thereby, when one drive wheel 231 is rotated forward and the other drive wheel 231 is rotated in reverse, the autonomous vehicle 120 is able to turn about the solenoid locking device 211.

As illustrated in FIG. 7, drive sources 233, such as a motor or the like, may be coupled to the drive wheels 231 on the inner sides of the autonomous vehicle 120 along the rotational axis C1, and the drive wheels 231 may be independently driven by a power output from the respective drive sources 233.

(b-2) Non-Drive Wheels

As illustrated in FIG. 8, the autonomous vehicle 120 may include the non-drive wheels 232 that are provided such that one non-drive wheel is on each side in the width direction (x-axis direction) of the body of the autonomous vehicle 120. Each of the non-drive wheels 232 may be provided so as to be able to turn about a turn axis C3 extending in the z-axis direction. Each non-drive wheel 232 may have a rotational axis C2 in the horizontal direction orthogonal to the turn axis C3. Thereby, for example, when the autonomous vehicle 120 is to make a turn after moving in the forward direction or the backward direction, the non-drive wheels 232 can be oriented to immediately follow in the direction of the turn. Furthermore, for example, when the autonomous vehicle 120 is to move in the forward direction or the backward direction after making a turn, the non-drive wheels 232 can be oriented to immediately follow in the forward or backward direction.

The non-drive wheels 232 may be disposed at positions apart from the drive wheels 231 in the front-rear direction of the body of the autonomous vehicle 120. In the example of FIG. 8, the non-drive wheels 232 are disposed forward of the drive wheels 231.

Note that although the two non-drive wheels 232 are included in the present embodiment, the number of non-drive wheels is not limited to this as long as, at least, the non-drive wheels are disposed at positions apart from the drive wheels 231 in the front-rear direction of the autonomous vehicle body. For example, a single non-drive wheel may be provided at a similar position to the positions of the two non-drive wheels 232 in the front-rear direction as illustrated in FIG. 8 and at the center in the width direction of the autonomous vehicle body.

In the autonomous vehicle 120 according to the present embodiment, the position of the center of gravity G as illustrated in FIG. 8 may be adjusted to a desired position, for example, by disposing a weight in the interior of the autonomous vehicle body.

For example, as illustrated in FIG. 8, in a plan view, ground-contact areas of the two drive wheels 231 are defined as ground-contact points P1 and P2 assuming that the ground-contact areas are at positions directly below the rotational axis C1. Also, ground-contact areas of the two non-drive wheels 232 are defined as ground-contact points P3 and P4 assuming that the ground-contact areas are at positions directly below the rotational axis C2.

Here, a first triangle T1 and a second triangle T2 are considered. The first triangle T1 is formed by the ground-contact points P1 and P2 of the two drive wheels 231, and one ground-contact point P3 of the two non-drive wheels 232. The second triangle T2 is formed by the ground-contact points P1 and P2 of the two drive wheels 231, and the other ground-contact point P4 of the two non-drive wheels 232. FIG. 8 illustrates the first triangle T1 as a dotted line and the second triangle T2 as a two-dot chain line.

The first triangle T1 and the second triangle T2 each include the ground-contact points P1 and P2 of the two drive wheels 231 as two of the three vertices of the triangle, and also include a line segment connecting the ground-contact points P1 and P2 as one side of the triangle. Therefore, the first triangle T1 and the second triangle T2 necessarily overlap in a part including this line segment. The first triangle T1 and the second triangle T2 have the line segment connecting the ground-contact points P1 and P2 as the common base, and respectively have the ground-contact points P3 and P4 of the two non-drive wheels 232 as the third vertex of the triangle. Therefore, the overlapping part between the first triangle T1 and the second triangle T2 becomes a triangle T3 having the base as one side. In the present embodiment, as illustrated in FIG. 8, the position and weight of a weight or the like to be disposed in the interior of the autonomous vehicle body are adjusted such that the center of gravity G of the autonomous vehicle 120 is disposed in the triangle T3, which is the overlapping part between the first triangle T1 and the second triangle T2.

Because this configuration can sufficiently apply a load to the two drive wheels 231, the ground-contact pressure of the drive wheels 231 can be increased, and the drive wheels 231 can be caused to more efficiently generate a driving force. Compared to the case where the position of the center of gravity G is not in the overlapping part T3 of FIG. 8, a greater driving force can be output even if the same quantity of power is transmitted from the drive source 233 to the drive wheels 231. Thereby, the autonomous vehicle can convey a heavier object.

Note that the position of the center of gravity G is preferably disposed at the center of the height in the y direction of the triangle T3, which is the overlapping part between the first triangle T1 and the second triangle T2. The conveyance performance of the autonomous vehicle 120 is varied with the position of the center of the pressure of the floor reaction force. However, when the autonomous vehicle 120 is left to stand still on the floor, the center of the pressure of the floor reaction force is equal to the position of the center of gravity G of the autonomous vehicle 120. The center of the pressure of the floor reaction force of the autonomous vehicle 120 can be shifted by the reaction force received from the conveyance target during conveyance, acceleration or deceleration during travelling, and the like. Even if the center of the pressure of the floor reaction force changes in this manner, when the magnitude of the rate of change in speed of the acceleration or deceleration is the same, it is possible to minimize a possibility that the center of the pressure of the floor reaction force is shifted outward of the triangle T3 by disposing the center of gravity G at the center of the height in the y direction of the triangle T3. This can suppress change in the conveyance performance of the autonomous vehicle 120 that is towing the conveyance target.

<Configuration of Conveyance System 200>

Figure 10:
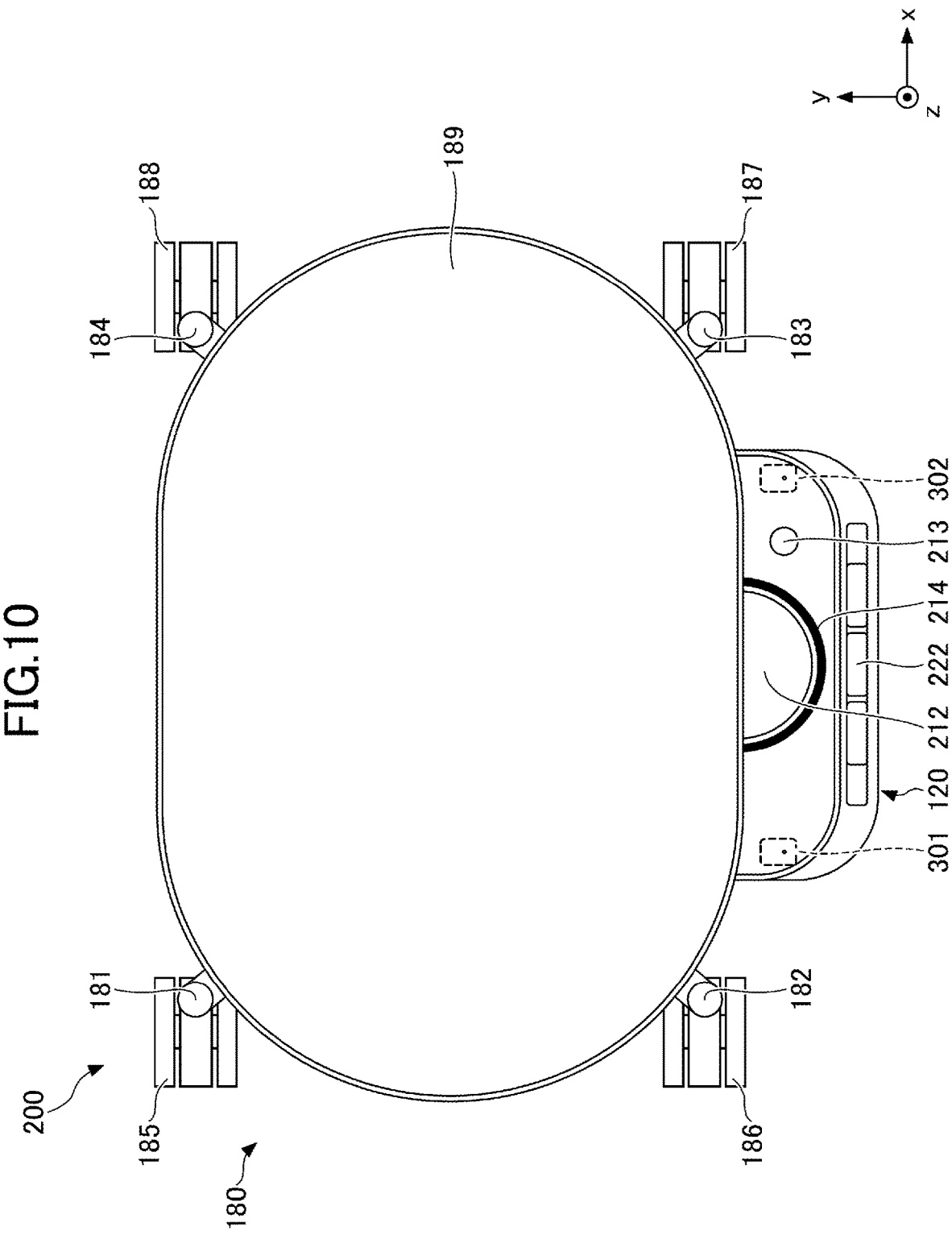
FIG. 10 is a plan view of the conveyance system of FIG. 9 as viewed from above.
Figure 11:
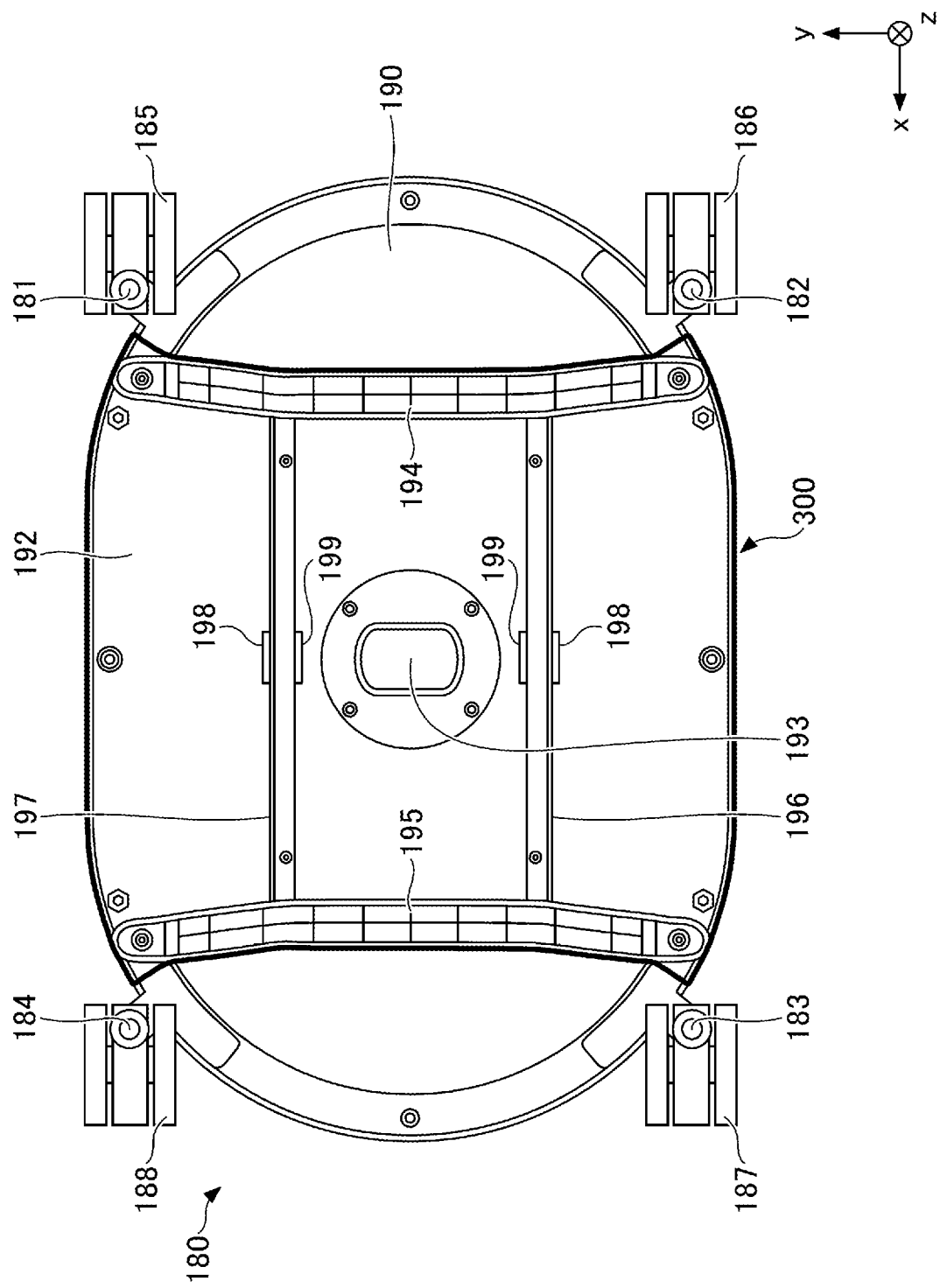
FIG. 11 is a plan view of the shelving unit as viewed from below.
Figure 12:
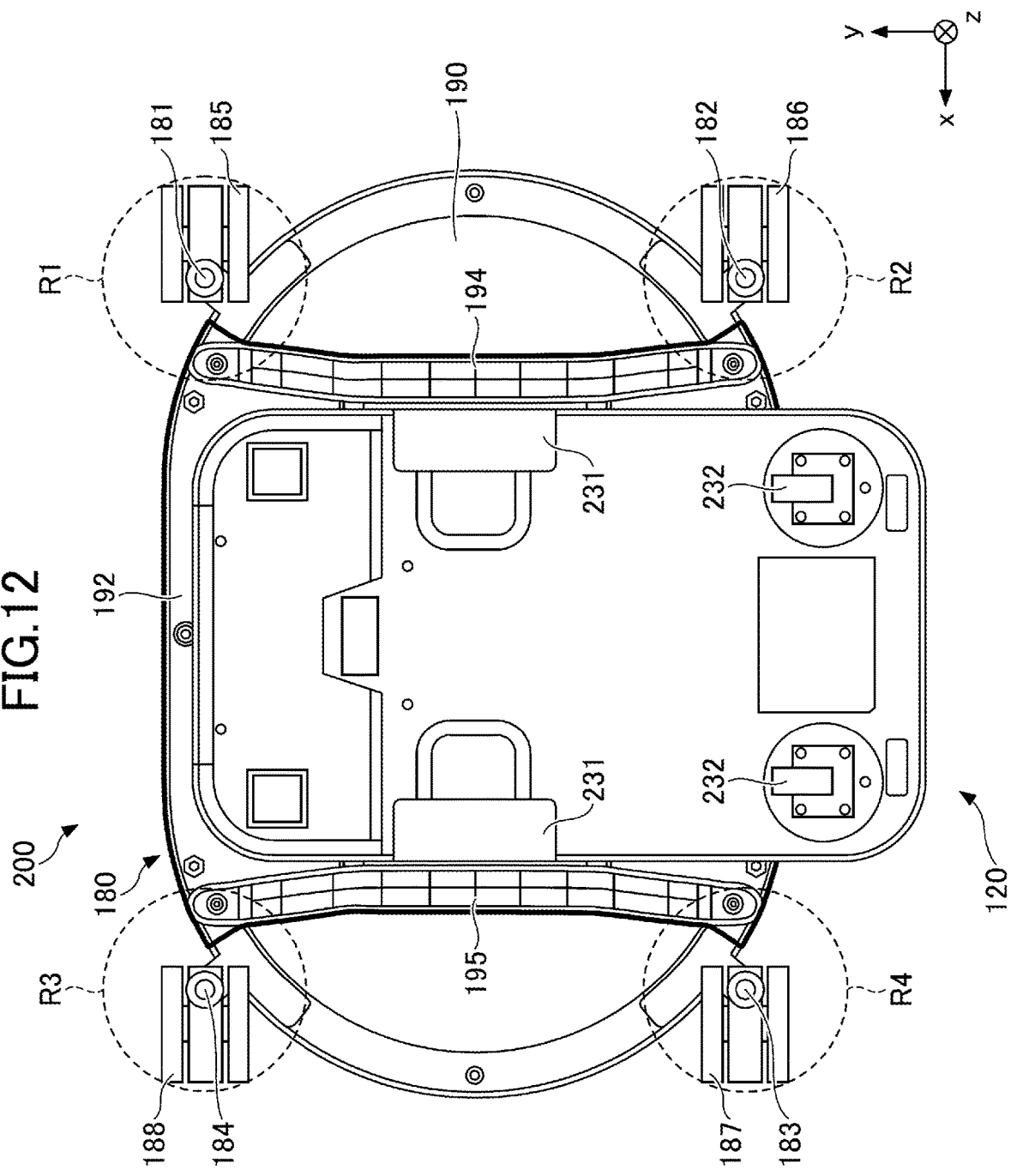
FIG. 12 is a plan view of the conveyance system of FIG. 9 as viewed from below.
Figure 13:
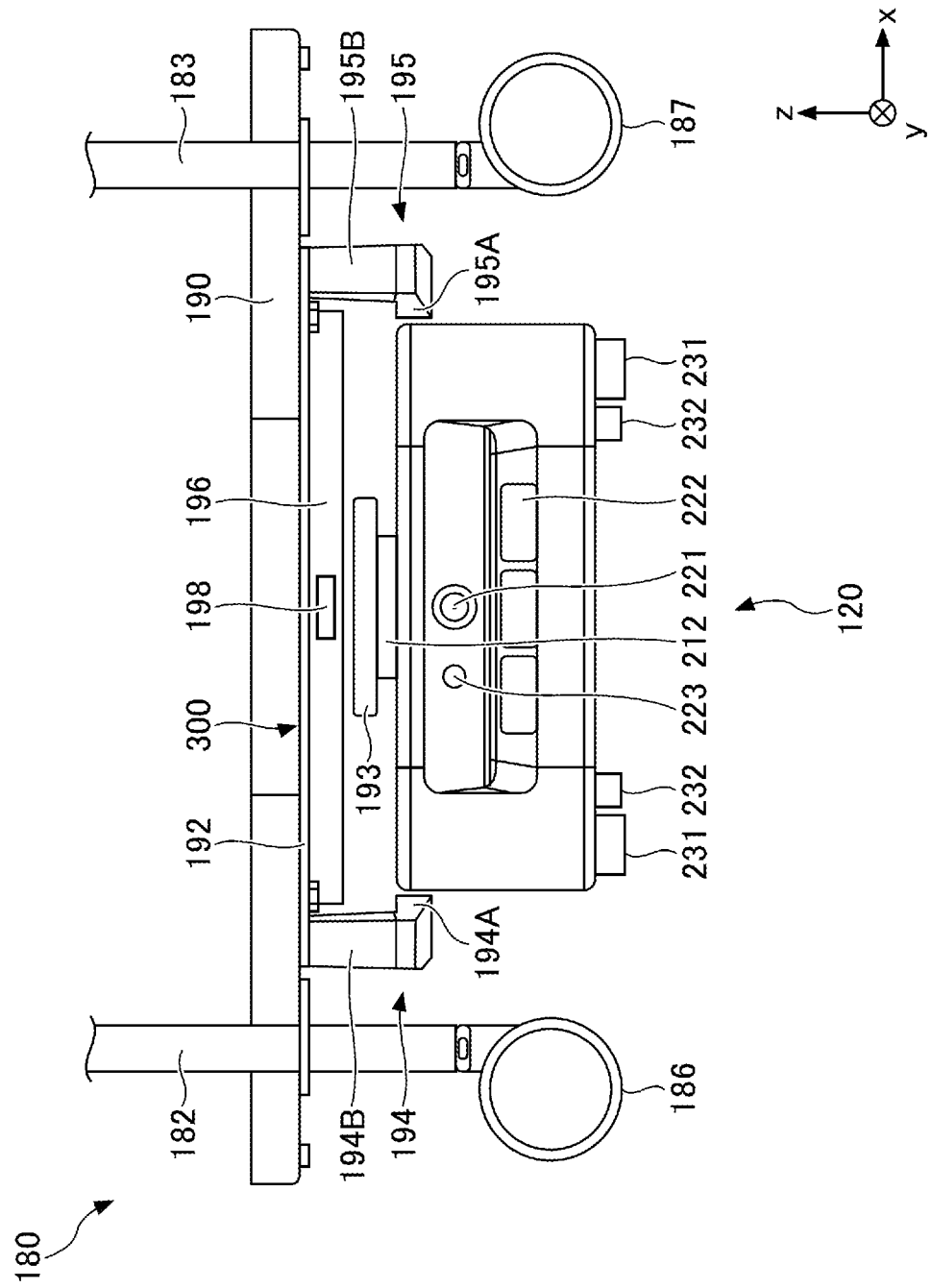
FIG. 13 is a front view of the vicinity of a coupling of the conveyance system of FIG. 9.

A conveyance system 200 according to the embodiment will be described with reference to FIG. 9 to FIG. 18. FIG. 9 is a perspective view illustrating a schematic configuration of the conveyance system 200 according to the embodiment. FIG. 10 is a plan view of the conveyance system 200 of FIG. 9 as viewed from above. FIG. 11 is a plan view of the shelving unit 180 as viewed from below. FIG. 12 is a plan view of the conveyance system 200 of FIG. 9 as viewed from below. FIG. 13 is a front view of the vicinity of a coupling of the conveyance system 200 of FIG. 9.

As illustrated in FIG. 9, FIG. 10, and FIG. 12, the conveyance system 200 may include the above-described autonomous vehicle 120 and the conveyance-object shelving unit 180. Similar to the conveyance target, such as the above-described shelving unit 130, 140, or 150, the shelving unit 180 is coupled to the autonomous vehicle 120 and can be conveyed by the autonomous vehicle 120 to move.

FIG. 9, FIG. 10, and FIG. 12 illustrate a state in which the shelving unit 180 is coupled to the autonomous vehicle 120 and is movable integrally with the autonomous vehicle 120. Note that a coupling state between the autonomous vehicle 120 and the shelving unit 180 is similar to the case of the shelving unit 130 as described with reference to FIG. 5B and the like, and thus description thereof will be omitted. Description of the components of the autonomous vehicle 120 will also be omitted.

As illustrated in FIG. 9, the shelving unit 180, which is an example of the conveyance object, is a shelving unit having three shelves. The shelving unit 180 includes: a top plate 189 disposed on the upper side; a bottom plate 190 disposed on the lower side; and a middle plate 191 disposed at a middle position between the top plate 189 and the bottom plate 190. The top plate 189, the bottom plate 190, and the middle plate 191 have the same shape in a plan view, and especially in the present embodiment, each plate has an oblong shape.

The term "oblong" used in the present embodiment refers to a shape formed by connecting two circles having equal radii by common external tangents thereof (e.g., a shape of a track used in track and field). In the present embodiment, the oblong shape of the top plate 189, the bottom plate 190, or the middle plate 191 may be formed such that the entry direction of the autonomous vehicle 120 (y direction) is a minor axis and the width direction of the autonomous vehicle 120 upon coupling (x direction) is a major axis.

Four pillars 181, 182, 183, and 184 may be coupled to the outer edges of the top plate 189, the bottom plate 190, and the middle plate 191. The pillars 181 to 184 may be disposed to extend in the z direction. For example, as illustrated in FIG. 9, the pillar 181 is disposed at a position on the negative x-direction side and on the positive y-direction side in the oblong shape of the top plate 189, the bottom plate 190, and the middle plate 191. The pillar 182 may be disposed at a position on the negative x-direction side and on the negative y-direction side in the oblong shape of the top plate 189, the bottom plate 190, and the middle plate 191. The pillar 183 may be disposed at a position on the positive x-direction side and on the negative y-direction side in the oblong shape of the top plate 189, the bottom plate 190, and the middle plate 191. The pillar 184 may be disposed at a position on the positive x-direction side and on the positive y-direction side in the oblong shape of the top plate 189, the bottom plate 190, and the middle plate 191.

Casters 185, 186, 187, and 188 may be rotatably disposed at the lower ends of the four pillars 181, 182, 183, and 184. That is, "fulcrums" for turning of the casters 185 to 188 are axial centers of the pillars 181 to 184.

The bottom plate 190 may be a similar part to the part for the bottom shelf 400 of the shelving unit 130 as described with reference to FIG. 5A and the like. The bottom plate 190 may be disposed at a height that allows for entry of the autonomous vehicle 120 thereunder. The casters 185 to 188 may be coupled via the pillars 181 to 184 to the bottom plate 190 so as to be rotatable about the respective fulcrums.

The shelving unit 180 may further include: a projection 193 (coupling); a pair of guide frames 194 and 195; and a pair of brackets 196 and 197.

The projection 193 may be a similar part to the projection 440 of the shelving unit 130 as described with reference to FIG. 6 or the like. As illustrated in FIG. 11, the projection 193 may be provided on the lower surface of the bottom plate 190, and may be coupled to the autonomous vehicle 120. Similar to the projection 440, the projection 193 may be formed to have a shape that can be mated with the locking device 211 of the autonomous vehicle 120.

The guide frames 194 and 195 may be similar parts to the frame guides 410 and 420 of the shelving unit 130 as described in FIGS. 5A and 5B and the like. As illustrated in FIG. 9, FIG. 11, FIG. 12, and FIG. 13, the guide frames 194 and 195 may be provided on the lower surface of the bottom plate 190, and may guide the autonomous vehicle 120 so as to move to a position of the projection 193 from a predetermined direction (positive y-direction side or negative y-direction side). The guide frames 194 and 195 may extend along the entry direction of the autonomous vehicle 120 (y direction) and may be spaced to have a distance that is greater than the widthwise dimension of the body of the autonomous vehicle 120 in the x direction with the projection 193 being the center. As illustrated in FIG. 11 and the like, for example, the guide frames 194 and 195 may be formed to be curved such that both ends thereof in the y direction widen outward in the x direction with respect to a central region. This configuration facilitates entry of the autonomous vehicle 120 below the shelving unit 180.

As illustrated in FIG. 11 and FIG. 13, the brackets 196 and 197 may be provided to extend downward from the lower surface of the bottom plate 190 between the guide frames 194 and 195, and may be next to both sides of the projection 193 in the y direction, i.e., both sides in the entry direction of the autonomous vehicle 120. As illustrated in FIG. 11 and FIG. 13, for example, the brackets 196 and 197 are formed, in the form of a straight line, to extend in a direction (x direction) orthogonal to the entry direction of the autonomous vehicle 120. The brackets 196 and 197 may be provided with two types of markings 198 and 199 that face the predetermined direction, i.e., the entry direction of the autonomous vehicle 120, and are recognizable by the autonomous vehicle 120.

Of the two types of markings 198 and 199, one marking 198 (first marking) may be provided to the brackets 196 and 197 so as to be oriented outward of the shelving unit 180 along the predetermined direction. That is, as illustrated in FIG. 11 and FIG. 13, the marking 198 may be provided on the surfaces of the brackets 196 and 197 that are to be oriented to the autonomous vehicle 120 upon entry of the autonomous vehicle 120 from the exterior. In other words, the marking 198 may be provided on the surface on the negative y-direction side of the bracket 196 and the surface on the positive y-direction side of the bracket 197.

Meanwhile, of the two types of markings 198 and 199, the other marking 199 (second marking) may be provided to the brackets 196 and 197 so as to be oriented inward of the shelving unit 180 along the predetermined direction. That is, as illustrated in FIG. 11, the marking 199 may be provided on the surfaces of the brackets 196 and 197 that are oriented to the projection 193, i.e., the surface on the positive y-direction side of the bracket 196 and the surface on the negative y-direction side of the bracket 197.

The markings 198 and 199 may be a given marking whose image captured by the front RGB camera 221 and/or the rear RGB camera 320 mounted in the autonomous vehicle 120 can provide information that is readable. Examples thereof include barcodes, characters, figures, pictures, and any combination thereof. For example, the marking 198 provided to be oriented outward includes identification information, such as the type and product name of the shelving unit 180. The autonomous vehicle 120 can determine the conveyance target based on information obtained from the marking 198 via the front RGB camera 221 and/or the rear RGB camera 320. The marking 198 can also be used as an indicator of position adjustment for entry to a coupling position to the shelving unit 180 when the autonomous vehicle 120 is not in the shelving unit 180. For example, the autonomous vehicle 120 can recognize a relative positional relationship with the marking 198 based on the position of the marking 198 in the image captured by the front RGB camera 221 and/or the rear RGB camera 320.

Meanwhile, the marking 199 provided to be oriented inward can be used as an indicator of position adjustment for positioning the autonomous vehicle 120 to a coupling position to the shelving unit 180 when the autonomous vehicle 120 is at a position that cannot recognize the marking 198 with the front RGB camera 221 and/or the rear RGB camera 320 after entering below the shelving unit 180. For example, the autonomous vehicle 120 can recognize a relative positional relationship with the marking 199 based on the position of the marking 199 in the image captured by the front RGB camera 221 and/or the rear RGB camera 320. The inward-oriented marking 199 may include identification information similar to the information included in the outward-oriented marking 198. Alternatively, the inward-oriented marking 199 may include information different from the information included in the marking 198, such as the position, shape, and type of the projection 193, which is the coupling on the shelving unit 180 side.

In the conveyance system 200 of the present embodiment, in order for the autonomous vehicle 120 to identify the conveyance object designated by a user (the shelving unit 180 in the present embodiment), there is a need to obtain information in relation to the conveyance object from the markings 198 and 199 provided to the conveyance object. Especially when the autonomous vehicle 120 according to the present embodiment is used in ordinary homes, the conveyance object can be mainly a piece of daily-use furniture, such as a shelving unit, a kitchen wagon, or the like, like the shelving unit 180. Therefore, the markings 198 and 199 for identification of the conveyance object are provided to a noticeable site of furniture, such as the front surface thereof, the side surface thereof, or the like, those markings are readily in the user's sight in daily lives and may impair an appealing appearance of living spaces.

Meanwhile, the shelving unit 180 according to the present embodiment includes the brackets 196 and 197 that are provided to extend downward from the lower surface of the bottom plate 190 between the guide frames 194 and 195 and are next to both sides of the projection 193 in the predetermined direction. The brackets 196 and 197 may be provided with the markings 198 and 199 that face the predetermined direction (y direction) so as to be recognizable by the autonomous vehicle 120.

The projection 193, which is the shelving unit 180-side coupling to the autonomous vehicle 120, may be provided so as to overlap the central region of the lower surface of the bottom plate 190 of the shelving unit 180, in order to facilitate conveyance of the shelving unit 180. Because the brackets 196 and 197 may be provided next to both sides of the projection 193 in the y direction, the brackets 196 and 197 may also be provided near the central region of the lower surface of the bottom plate 190. Therefore, the markings 198 and 199 provided to the brackets 196 and 197 may also be disposed near the central region of the lower surface of the bottom plate 190 of the shelving unit 180. With the above configuration of the present embodiment, the markings 198 and 199 provided to the conveyance object can be hidden below the lower surface of the bottom plate 190, and cannot be readily seen by residents in daily lives. For example, as illustrated in FIG. 13, the marking 198 provided to the shelving unit 180 so as to be oriented outward can be seen only by residents who have lowered their heads to a position approximately the same as the height of the autonomous vehicle 120 and looked into the center of the bottom plate 190 of the shelving unit 180. The marking 199 provided to be oriented inward of the shelving unit 180 is disposed on the rear side of the marking 198 and is at a position that further cannot be readily seen. Thereby, even if the conveyance objects including the markings 198 and 199 provided thereto are placed in a room, impairment in an appealing appearance in living spaces can be suppressed. This can promote introduction of the conveyance system 200 according to the present embodiment into living spaces of humans.

The conveyance system 200 according to the present embodiment utilizes two types of markings 198 and 199. The marking 198 may be provided on the surfaces of the brackets 196 and 197 that are to be oriented outward of the shelving unit 180 along the predetermined direction (y direction). The other marking 199 may be provided on the surfaces of the brackets 196 and 197 that are to be oriented inward of the shelving unit 180 along the predetermined direction.

With this configuration, the marking 198 can record readable information before the autonomous vehicle 120 enters below the shelving unit 180, and the marking 199 can be utilized for fine tuning of a relative position to the projection 193, which is the shelving unit 180-side coupling, after entry of the autonomous vehicle 120 below the shelving unit 180. Thereby, it is possible to achieve coupling between the autonomous vehicle 120 and the shelving unit 180 with higher accuracy.

Figure 14:
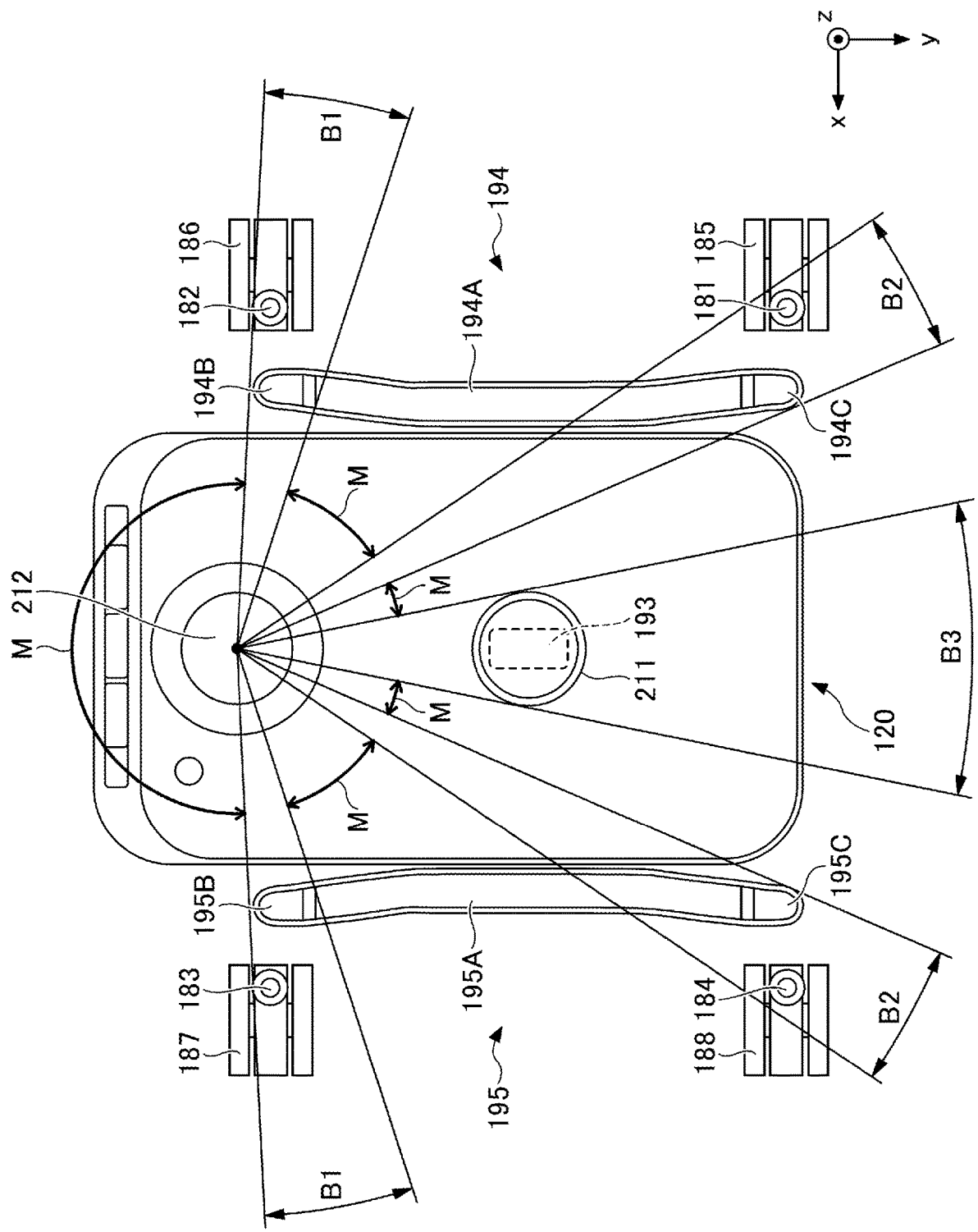
FIG. 14 is a schematic view for describing arrangement of casters.

FIG. 14 is an explanatory schematic view for describing arrangement of the casters 185 to 188. FIG. 14 is a plan view of the conveyance system 200 as viewed from above, and illustrates the autonomous vehicle 120, and only the guide frames 194 and 195, the pillars 181 to 184, and the casters 185 to 188 of the shelving unit 180.

As illustrated in FIG. 14, the guide frame 194 may include: a beam 194A extending in the y direction; and a pair of pillars 194B and 194C that are coupled to the lower surface of the bottom plate 190 at both ends of the beam 194A, thereby hanging the beam 194A. Similarly, the guide frame 195 may include: a beam 195A extending in the y direction; and a pair of pillars 195B and 195C that are coupled to the lower surface of the bottom plate 190 at both ends of the beam 195A, thereby hanging the beam 195A. The fulcrums of the four casters 185 to 188 (i.e., the pillars 181 to 184) may be disposed outward of the guide frames 194 and 195 in a facing direction of the guide frames 194 and 195 (x direction). In addition, each of the fulcrums thereof may be disposed at a position that at least partially overlaps the range of the width of the pillar 194C, 194B, 195B, or 195C along the y direction. In the following, the definition of arrangement of the casters 185 to 188 as described above is also described as a "first definition in relation to the arrangement of the casters 185 to 188".

The arrangement of the casters 185 to 188 can also be expressed as follows using a positional relationship with the LIDAR device 212 (LIDAR sensor) of the autonomous vehicle 120. The LIDAR device 212 may be disposed at a height position that overlaps the pillars 194B, 194C, 195B, and 195C of the guide frames, and may detect an object in the outer circumferential direction. For example, as illustrated in FIG. 10, when the autonomous vehicle 120 is coupled to the shelving unit 180, the LIDAR device 212 may be disposed at a position at which the LIDAR device 212 is exposed on the negative y-direction side with respect to the shelving unit 180. As illustrated in FIG. 14, when the autonomous vehicle 120 is coupled to the shelving unit 180, each of the fulcrums 182 and 183 of the two casters 186 and 187, disposed on the LIDAR 212 side, out of the four casters 185 to 188 may be disposed at a position that at least partially overlaps a range B1 that is a blind spot where measurement is inhibited by the pillar 194B or 195B in the outer circumferential measurement range of the LIDAR device 212.

Each of the fulcrums 181 and 184 of the other two casters 185 and 188 may be disposed at a position that at least partially overlaps a range B2 that is a blind spot where measurement is inhibited by the pillar 194C or 195C in the outer circumferential measurement range of the LIDAR device 212. In the following, the definition of arrangement of the casters 185 to 188 as described above is also described as a "second definition in relation to the arrangement of the casters 185 to 188".

Note that the measurement range in the outer circumferential direction of the LIDAR device 212 also includes a range B3 that is a blind spot where measurement is inhibited by the locking device 211 and the projection 193 that are disposed on the positive y-direction side with respect to the LIDAR device 212. Therefore, as illustrated in FIG. 14, an outer circumferential measurable range M of the LIDAR device 212 in a state in which the autonomous vehicle 120 is coupled to the shelving unit 180 is the entire outer circumferential range excluding the above three blind spots, i.e., the ranges B1, B2, and B3.

The above-described "first definition in relation to the arrangement of the casters 185 to 188" is encompassed by the "second definition in relation to the arrangement of the casters 185 to 188". As is clear from FIG. 14, if the "first definition in relation to the arrangement of the casters 185 to 188" is satisfied, the "second definition in relation to the arrangement of the casters 185 to 188" can be satisfied.

In the present embodiment, by satisfying the "first definition in relation to the arrangement of the casters 185 to 188", the "second definition in relation to the arrangement of the casters 185 to 188", or both, the pillars 181 to 184 to be the fulcrums of the casters 185 to 188 may be disposed in the ranges B1 and B2, or thereabound, which are the blind spots of the measurement range of the LIDAR device 212 that are formed by the pillars 194B, 194C, 195B, and 195C of the guide frames 194 and 195. Thereby, it is possible to suppress the blind spots of the measurement range of the LIDAR device 212 from widening due to the fulcrums of the casters 185 to 188. This can suppress reduction in surrounding object-detecting accuracy of the LIDAR device 212 in a state in which the autonomous vehicle 120 is towing the shelving unit 180.

Figure 15:
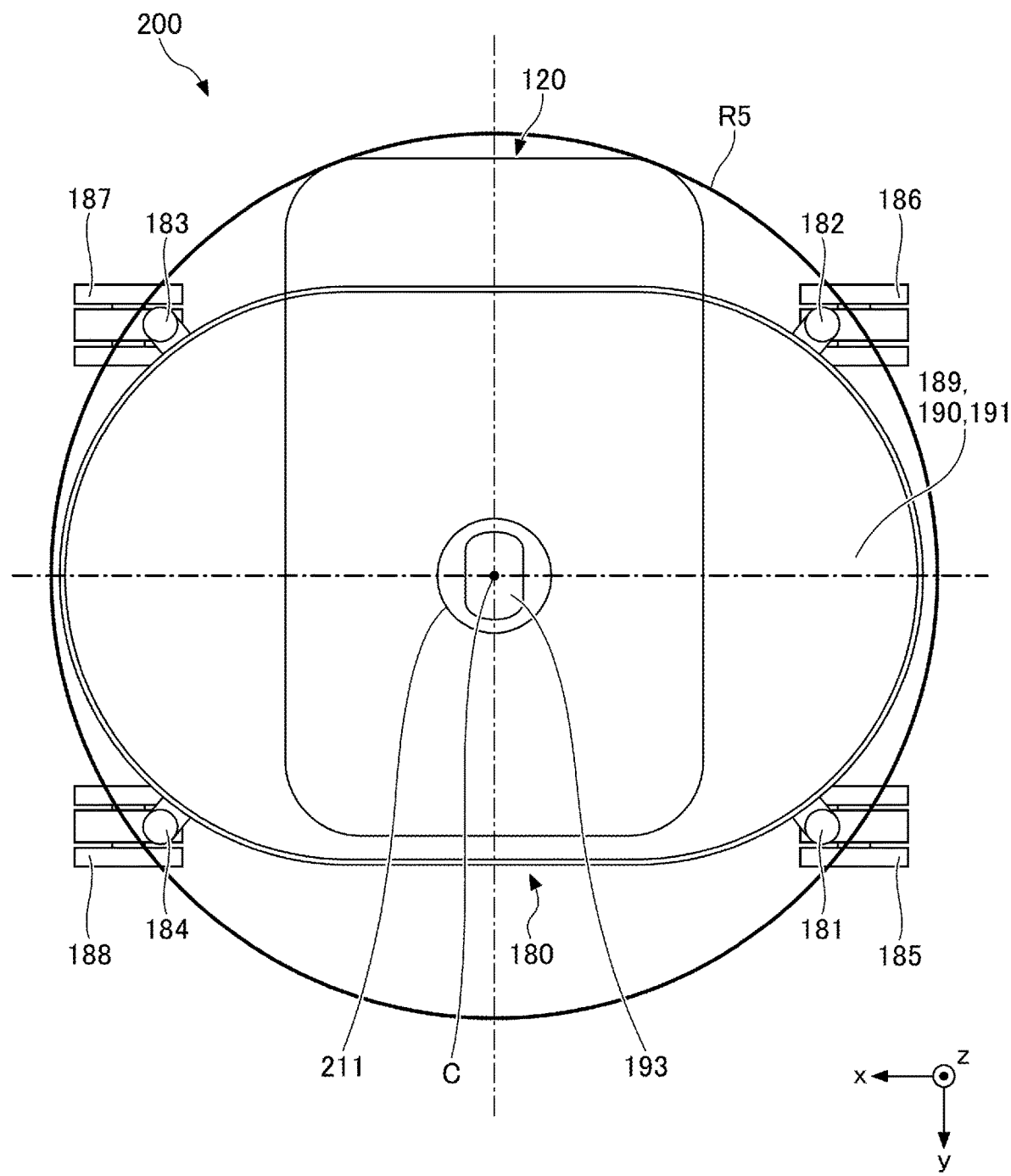
FIG. 15 is a schematic view illustrating an example of a turn circle in a state in which the autonomous vehicle is coupled to the shelving unit.

FIG. 15 is a schematic view illustrating an example of a turn circle R5 in a state in which the autonomous vehicle 120 is coupled to the shelving unit 180. As illustrated in FIG. 15, the projection 193, which is the shelving unit 180-side coupling, is preferably disposed at a position that overlaps a center point C of the turn circle R5 of the shelving unit 180, the turn circle R5 being defined in accordance with the casters 185 to 188. This configuration can make smaller the turn radius of the conveyance system 200 when the shelving unit 180 is coupled to and moved by the autonomous vehicle 120. It is also desirable that in a state in which the autonomous vehicle 120 is coupled to the shelving unit 180, the front part of the autonomous vehicle 120 exposed from the shelving unit 180 to the exterior be included in the range of the turn circle R5. This can minimize the turn radius of the conveyance system 200. In the example of FIG. 15, both widthwise corners of the front end of the autonomous vehicle 120 body are rounded and the end surface of the autonomous vehicle 120 body is curved so as to be closer to the center of the autonomous vehicle 120 body in a plan view. This allows the autonomous vehicle shape to be included in the range of the turn circle R5.

Dimensions of the components of the conveyance system 200 of FIG. 15 are exemplified. First, the dimensions of the components of the autonomous vehicle 120 are, for example, as follows.

Dimension of the vehicle body in the front-rear direction: 389 mm

Dimension of the vehicle body in the width direction: 240 mm

Distance from the front end of the vehicle body to the rotational axis C1 of the drive wheel 231: 239 mm Wheelbase between the non-drive wheel 232 and the drive wheel 231: 183.5 mm Distance between the turn axes C3 of the pair of non-drive wheels 232: 154 mm Diameter of the drive wheel 231: 91 mm Tread between the pair of drive wheels 231 (distance between the ground-contact centers of the drive wheels 231): 200 mm Dimensions of the components of the shelving unit 180 are, for example, as follows.

Major axis of the oblong shape of the shelf: 488 mm

Minor axis of the oblong shape of the shelf: 328 mm

Diameters of the turn circles R1 to R4 of the casters 185 to 188: 105 mm Diameter of the turn circle R5 of the shelving unit 180: 500 mm Turn diameter of the shelving unit 180 including the turn radii of the casters 185 to 188: 575 mm FIG. 16 is an explanatory schematic view for describing an advantage of the shelving unit 180 having the oblong shape. As illustrated in FIG. 10 to FIG. 12, FIG. 15, and the like, the bottom plate 190 (and the top plate 189 and the middle plate 191) of the shelving unit 180 may have the oblong shape in a plan view, as described above. The fulcrums (pillars 181 to 184) of the four casters 185 to 188 face each other in the y direction in the oblong shape and may be disposed outward, in the x direction, of both ends of a pair of straight-line sections each extending in the x direction. Further, the fulcrums may each be disposed at a position that at least partially overlaps the range of a region between the pair of straight-line sections in the y direction.

The definition of arrangement of the casters 185 to 188 can also be expressed as follows. First, a rectangle having the same center position C as in the oblong shape of the bottom plate 190 and having a long side and a short side respectively having the same lengths as the lengths of the major axis and the minor axis of the oblong shape thereof, is considered. When in a plan view, this rectangle is overlapped with the oblong, the fulcrums (pillars 181 to 184) of the four casters 185 to 188 may be disposed in regions where the rectangle and the oblong are not overlapped and which include the four corners of the rectangle.

Assuming that the bottom plate 190 (and the top plate 189 and the middle plate 191) of the shelving unit 180 have the oblong shape and the entry direction of the autonomous vehicle 120 is a minor-axis direction of the oblong shape, for example, as illustrated in FIG. 16, the straight-line section along the major-axis direction of the oblong shape is disposed on the rear-surface side of the autonomous vehicle 120. Thereby, if the autonomous vehicle 120 is caused to move rearward facing a wall surface 260 straight, the straight-line section of the oblong shape of the shelving unit 180 can be caused to approach the wall surface 260 facing the wall surface 260 straight. Therefore, the shelving unit 180 can be disposed with no gap with the wall surface 260.

Also, by disposing the fulcrums (pillars 181 to 184) of the four casters 185 to 188 with respect to the oblong shape of the shelf as described above, the pillars 181 to 184 can be included inward, in the y direction, of the straight-line section along the major-axis direction of the oblong shape. Thereby, when the shelving unit 180 is caused to approach the wall surface 260 as illustrated in FIG. 16, the pillars 181 to 184 are absent between the shelf and the wall surface. Therefore, the shelving unit 180 can be readily disposed with no gap with the wall surface 260.

Moreover, when each of the shelves of the shelving unit 180 has the oblong shape and the four casters 185 to 188 are arranged as described above with respect to the oblong shape, semi-circle regions on both sides in the major-axis direction of the oblong shape project outward, in the x direction, of the positions of the fulcrums of the casters 185 to 188. Thereby, a disposition surface can be extended to the semi-circle regions, and a disposition area of the shelving unit can be maximized.

FIG. 12 uses dotted lines to illustrate turn circles R1, R2, R3, and R4 about the fulcrums 181 to 184 of the casters 185 to 188 of the shelving unit 180. As illustrated in FIG. 12, in the present embodiment, the casters 185 to 188 of the shelving unit 180 are preferably disposed such that the turn circles R1 to R4 about the fulcrums 181 to 184 at least partially overlap the guide frames 194 and 195 in a plan view. With this configuration, the casters 185 to 188 can be disposed to be closer to the center in the x direction, and the interval between the caster 185 and the caster 188 facing in the x direction can be shortened and the interval between the caster 186 and the caster 187 facing in the x direction can be shortened. Thereby, it is possible to prevent interference between the casters 185 to 188 and the autonomous vehicle 120, and further shorten the turn radius R5 of the shelving unit 180.

As illustrated in FIG. 12, in the present embodiment, when the autonomous vehicle 120 is coupled to the shelving unit 180, a rear part of the autonomous vehicle 120 is disposed to be closer to the center (projection 193) than is an outer edge of the shelving unit 180. This can prevent a rear part of the autonomous vehicle 120 from projecting from a footprint of the shelving unit 180, and readily place the shelving unit 180 very near the wall as illustrated in FIG. 16.

As illustrated in FIG. 10, in the present embodiment, when the autonomous vehicle 120 is coupled to the shelving unit 180, the autonomous vehicle 120 may be disposed such that a front part of the autonomous vehicle 120 partially projects from the footprint of the shelving unit 180. Because the power switch 213 of the autonomous vehicle 120 is at a position projecting from the shelving unit 180, the above configuration enables readily pressing the button of the power switch 213 in a state in which the autonomous vehicle 120 is docked with the shelving unit 180. Similarly, because at least a part of the annular light source 214 disposed along the columnar shape of the LIDAR device 212 is at a position projecting from the shelving unit 180, display of the light source 214 can be seen in a state in which the autonomous vehicle 120 is docked with the shelving unit 180. This enables a user to recognize the drive state of the autonomous vehicle 120 via the light source 214. Similarly, because the ToF camera 222 of the autonomous vehicle 120 is disposed at a position projecting from the shelving unit 180, obstruction of the angle of view of the ToF camera 222 by the shelving unit 180 can be prevented even in a state in which the autonomous vehicle 120 is docked with the shelving unit 180. Similarly, because the microphones 301 and 302 can be disposed at positions projecting from the shelving unit 180, the autonomous vehicle 120 can perform voice recognition with high accuracy even in a state in which the autonomous vehicle 120 is docked with the shelving unit 180.

In the present embodiment, as illustrated in FIG. 11 and FIG. 13, a substrate 192 having a plate shape may be coupled, facing the lower surface, to at least the central region in the lower surface of the bottom plate 190 of the shelving unit 180. The substrate 192 is, for example, a metal plate, and is fixed to the bottom plate 190 through screw fastening or the like. The substrate 192 may be detachably coupled to the bottom plate 190.

In the present embodiment, the above-described projection 193, guide frames 194 and 195, and brackets 196 and 197 may be disposed on the lower surface of the substrate 192. That is, the projection 193, guide frames 194 and 195, and brackets 196 and 197 are provided via the substrate 192 to the lower surface of the bottom plate 190 of the shelving unit 180.

Therefore, the substrate 192, the projection 193, the guide frames 194 and 195, and the brackets 196 and 197 may be coupled to each other to form a single coupling unit 300. Thereby, the components related to coupling to the autonomous vehicle 120, including the projection 193, the guide frames 194 and 195, and the brackets 196 and 197, can be formed as a unit. When the coupling unit 300 is provided to a lower surface of existing furniture or the like, the resulting furniture or the like can be used as a conveyance object of the conveyance system 200. By including the coupling unit 300 in an intended object in this manner, a user can increase the number of conveyance objects that are to be conveyance targets of the conveyance system 200, leading to increased versatility.

Note that without forming, as a unit, the components related to coupling to the autonomous vehicle 120, including the projection 193, the guide frames 194 and 195, and the brackets 196 and 197, the components may be directly and individually provided to the bottom plate 190 of the shelving unit 180.

Figure 17:
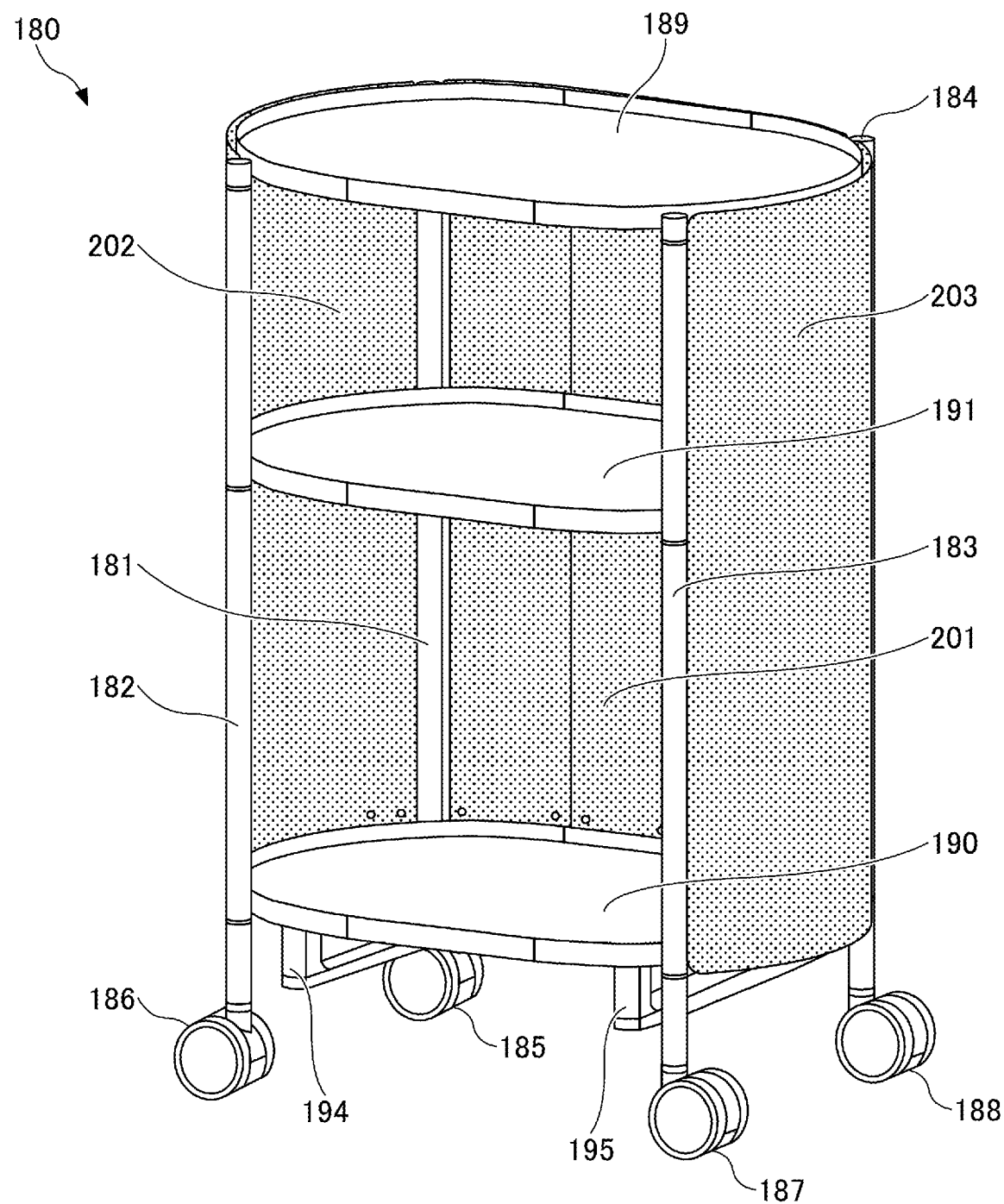
FIG. 17 is a view illustrating a modified example of the shelving unit.

FIG. 17 is a view illustrating a modified example of the shelving unit 180. As illustrated in FIG. 17, a center panel 201 and a pair of side panels 202 and 203 may be attached to the shelving unit 180. The center panel 201 may be formed at the rear part of the shelving unit 180 (e.g., a range between the pillar 181 and the pillar 184) along the outer edge of the oblong shape so as to cover a range between the top plate 189 and the bottom plate 190 in the height direction. The side panel 202 may be formed at a left lateral surface of the shelving unit (e.g., a range between the pillar 181 and the pillar 182) along the outer edge of the oblong shape so as to cover the range between the top plate 189 and the bottom plate 190 in the height direction. The other side panel 203 may be formed at a right lateral surface of the shelving unit (e.g., a range between the pillar 183 and the pillar 184) along the outer edge of the oblong shape so as to cover the range between the top plate 189 and the bottom plate 190 in the height direction.

By disposing the center panel 201 and the side panels 202 and 203 in this manner, it is possible to cover the rear and lateral parts of the shelving unit 180. This is advantageous, for example, when a user does not want someone else to see a thing on the shelving unit 180 from the lateral or rear side. Also, the center panel 201 and the side panels 202 and 203 may be attached at least partially.

Figure 18:
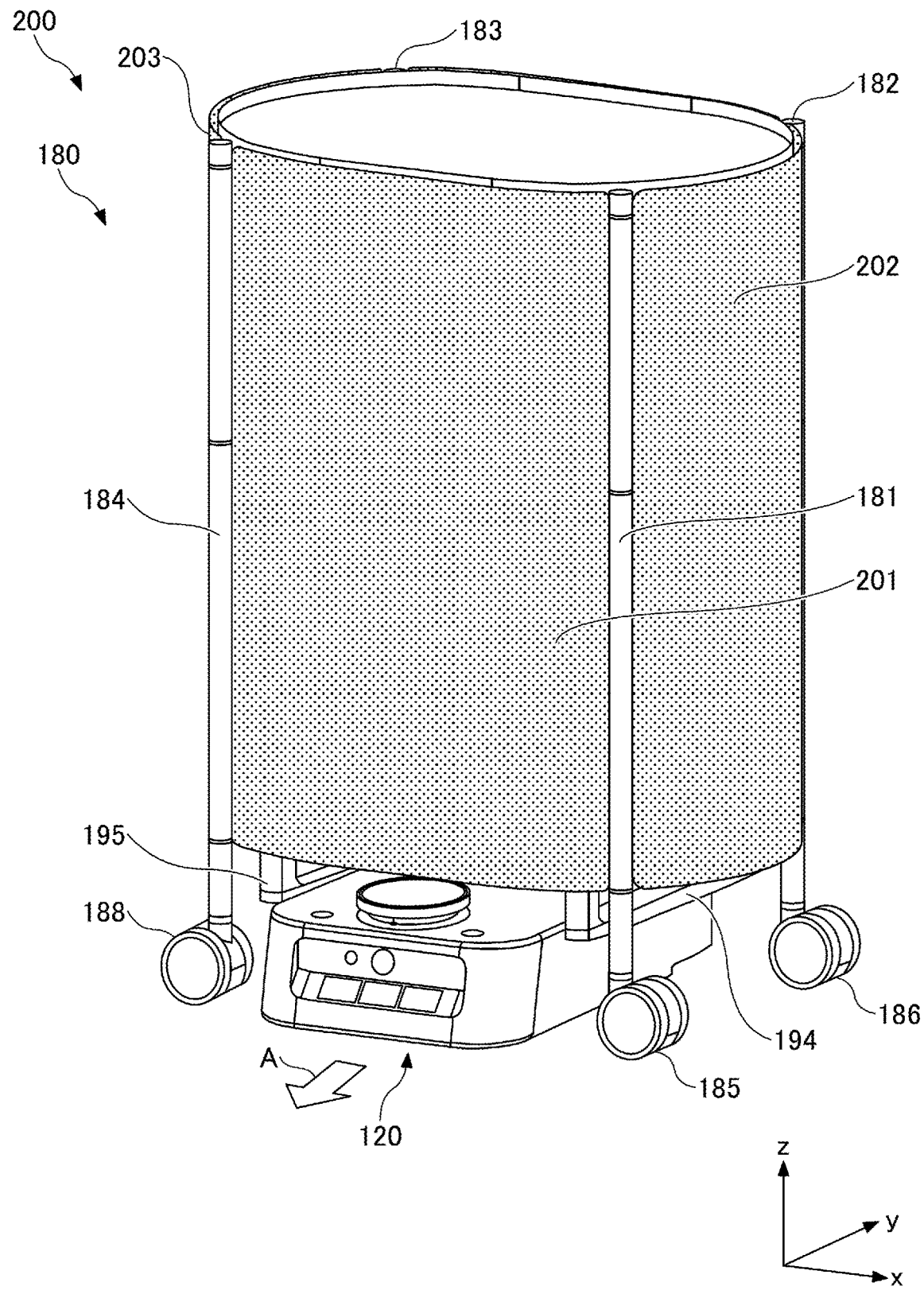
FIG. 18 is a view illustrating an example of a state in which the shelving unit in the modified example is disposed.

FIG. 18 is a view illustrating an example of a disposition state of the shelving unit 180 in the modified example. In the shelving unit 180 to which the center panel 201 and the side panels 202 and 203 are attached, for example, as illustrated in FIG. 18, the autonomous vehicle 120 is coupled to the shelving unit 180 such that the center panel 201 faces forward. In this case, for example, after disposition in proximity to the wall surface 260 as illustrated in FIG. 16, the engagement with the shelving unit 180 is released, thereby moving the autonomous vehicle 120 away from the shelving unit 180 as indicated by arrow A. This can dispose the shelving unit 180 such that the center panel 201 faces forward. Thereby, it is possible to hide the interior of the shelving unit 180 after disposition.

Other Embodiments

In the present specification (including the claims), if the expression "at least one of a, b, and c" or "at least one of a, b, or c" is used (including similar expressions), any one of a, b, c, a-b, a-c, b-c, or a-b-c is included. Multiple instances may also be included in any of the elements, such as a-a, a-b-b, and a-a-b-b-c-c. Further, the addition of another element other than the listed elements (i.e., a, b, and c), such as adding d as a-b-c-d, is included.

In the present specification (including the claims), in a case where an expression, such as "data as an input", "using data", "based on data", "according to data", or "in accordance with data" (including similar expressions) is used, such a case may unless otherwise noted, encompass a case in which data themselves are used and a case in which data obtained by processing data (e.g., data obtained by adding noise, normalized data, feature extracted from data, and intermediate representation of data) are used. If it is described that any result can be obtained "based on data as an input", "using data", "based on data", "according to data", or "in accordance with data" (including similar expressions), unless otherwise noted, a case in which the result is obtained based on only the data is included, and a case in which the result is obtained affected by another data other than the data, factors, conditions, and/or states is included. If it is described that "data are output" (including similar expressions), unless otherwise noted, a case in which data themselves are used as an output is included, and a case in which data obtained by processing data in some way (e.g., data obtained by adding noise, normalized data, feature extracted from data, and intermediate representation of various data) are used as an output is included.

In the present specification (including the claims), if the terms "connected" and "coupled" are used, the terms are intended as non-limiting terms that include any of direct, indirect, electrically, communicatively, operatively, and physically connected/coupled. Such terms should be interpreted according to a context in which the terms are used, but a connected/coupled form that is not intentionally or naturally excluded should be interpreted as being included in the terms without being limited.

In the present specification (including the claims), if the expression "A configured to B" is used, a case in which a physical structure of the element A has a configuration that can perform the operation B, and a permanent or temporary setting/configuration of the element A is configured/set to actually perform the operation B may be included. For example, if the element A is a general-purpose processor, the processor may have a hardware configuration that can perform the operation B and be configured to actually perform the operation B by setting a permanent or temporary program (i.e., an instruction). If the element A is a dedicated processor or a dedicated arithmetic circuit, a circuit structure or the like of the processor may be implemented so as to actually perform the operation B irrespective of whether the control instruction and the data are actually attached.

In the present specification (including the claims), if a term indicating containing or possessing (e.g., "comprising/including" and "having") is used, the term is intended as an open-ended term, including an inclusion or possession of an object other than a target object indicated by the object of the term. If the object of the term indicating an inclusion or possession is an expression that does not specify a quantity or that suggests a singular number (i.e., an expression using "a" or "an" as an article), the expression should be interpreted as being not limited to a specified number.

In the present specification (including the claims), even if an expression such as "one or more" or "at least one" is used in a certain description, and an expression that does not specify a quantity or that suggests a singular number (i.e., an expression using "a" or "an" as an article) is used in another description, it is not intended that the latter expression indicates "one". Generally, an expression that does not specify a quantity or that suggests a singular number (i.e., an expression using "a" or "an" as an article) should be interpreted as being not necessarily limited to a particular number.

In the present specification, if it is described that a particular advantage/result is obtained in a particular configuration included in an embodiment, unless there is a particular reason, it should be understood that that the advantage/result may be obtained in another embodiment or other embodiments including the configuration. It should be understood, however, that the presence or absence of the advantage/result generally depends on various factors, conditions, states, and/or the like, and that the advantage/result is not necessarily obtained by the configuration. The advantage/result is merely an advantage/result that results from the configuration described in the embodiment when various factors, conditions, and/or states are satisfied, and is not necessarily obtained in the claimed invention that defines the configuration or a similar configuration.

In the present specification (including the claims), if multiple hardware performs predetermined processes, each of the hardware may cooperate to perform the predetermined processes, or some of the hardware may perform all of the predetermined processes. Additionally, some of the hardware may perform some of the predetermined processes while other hardware may perform the remainder of the predetermined processes. In the present specification (including the claims), if an expression such as "one or more hardware perform a first process and the one or more hardware perform a second process" (including similar expressions) is used, the hardware that performs the first process may be the same as or different from the hardware that performs the second process. That is, the hardware that performs the first process and the hardware that performs the second process may be included in the one or more hardware. The hardware may include an electronic circuit, a device including an electronic circuit, or the like.

In the present specification (including the claims), if multiple storage devices (memories) store data, each of the multiple storage devices may store only a portion of the data or may store an entirety of the data. Also, a configuration in which some of the multiple storage devices store data may be included.

Although the embodiments of the present disclosure have been described in detail above, the present disclosure is not limited to the individual embodiments described above. Various additions, modifications, substitutions, partial deletions, and the like may be made without departing from the conceptual idea and spirit of the invention derived from the contents defined in the claims and the equivalents thereof. For example, in the embodiments described above, when numerical values or mathematical formulae are used for description, these are used for illustrative purposes and do not limit the scope of the present disclosure. Additionally, the orders of operations described in the embodiments are illustrative and do not limit the scope of the present disclosure.

In the above embodiments, the shelving unit 180 is described as an example of the conveyance object that is to be the conveyance target of the conveyance system 200. However, the structure of the shelving unit 180 is not limited to this. For example, the shapes of the top plate 189, the bottom plate 190, and the middle plate 191 may be shapes other than the oblong shape. Also, the number of shelves may be increased or decreased as long as at least the bottom plate 190 remains. Also, the height of the four pillars 181 to 184 may be increased or decreased, and the number of pillars may be increased or decreased. Also, the number of the casters 185 to 188 may also be increased or decreased in conformity to the increase or decrease of the pillars. The shape and configuration of the shelving unit 180 may be adjusted by changing parts in accordance with needs of users.

Aspects of the present invention are, for example, as follows.
<1> A conveyance object, which is configured to be coupled to an autonomous vehicle and conveyed by the autonomous vehicle to move, the conveyance object including:
a bottom plate;
a coupling provided on a lower surface of the bottom plate and configured to be coupled to the autonomous vehicle;
a pair of guide frames provided on the lower surface and configured to guide the autonomous vehicle so as to move to a position of the coupling from a predetermined direction; and
a pair of brackets provided to extend downward from the lower surface between the pair of guide frames and disposed on both sides of the coupling in the predetermined direction, each of the brackets being provided with a marking that faces the predetermined direction and that is recognizable by the autonomous vehicle.

<2> The conveyance object according to <1> above, further including:
a plurality of wheels, wherein
the coupling is disposed at a position that overlaps a center point of a turn circle of the conveyance object, the turn circle being defined in accordance with the plurality of wheels.

<3> The conveyance object according to <1> above, wherein
the marking includes
a first marking provided to the brackets so as to be oriented outward of the conveyance object along the predetermined direction, and
a second marking provided to the brackets so as to be oriented inward of the conveyance object along the predetermined direction.

<4> The conveyance object according to <2> above, wherein
the guide frames each include
a beam extending in the predetermined direction, and
a pair of pillars that are coupled to the lower surface at both ends of the beam, thereby hanging the beam, wherein
at least one fulcrum of the plurality of wheels is disposed outward of the guide frames in a facing direction of the guide frames, and
the at least one fulcrum of the plurality of wheels is disposed at a position that at least partially overlaps a range of a width of the pillar along the predetermined direction as viewed from a direction perpendicular to the predetermined direction.

<5> The conveyance object according to <2> above, wherein
the bottom plate has an oblong shape,
at least one fulcrum of the plurality of wheels is disposed outward of both ends of a pair of facing straight lines of the oblong shape, as viewed from an upper surface of the conveyance object in a direction perpendicular to the lower surface of the conveyance object, and
the at least one fulcrum of the plurality of wheels is disposed at a position that at least partially overlaps a range of a region between the pair of straight lines, as viewed from the upper surface of the conveyance object in the direction perpendicular to the lower surface of the conveyance object.

<6> The conveyance object according to <2> above, wherein
each of the plurality of wheels is disposed such that a turn circle about a fulcrum of the wheel at least partially overlaps the guide frame, as viewed from an upper surface of the conveyance object in a direction perpendicular to the lower surface of the conveyance object.

<7> A conveyance object-coupling unit, which is configured to couple a conveyance object to an autonomous vehicle such that the conveyance object is conveyed by the autonomous vehicle to move, the conveyance object-coupling unit including:
a substrate configured to be disposed on a lower surface of a bottom plate of the conveyance object;
a coupling provided on the lower surface of the substrate and configured to be coupled to the autonomous vehicle;
a pair of guide frames provided on the lower surface of the substrate and configured to guide the autonomous vehicle so as to move to a position of the coupling from a predetermined direction; and
a pair of brackets provided to extend downward from the lower surface between the pair of guide frames and disposed on both sides of the coupling in the predetermined direction, each of the brackets being provided with a marking that faces the predetermined direction and that is recognizable by the autonomous vehicle.

<8> The conveyance object-coupling unit according to <7> above, wherein
the substrate is disposed on the bottom plate of the conveyance object such that the coupling is disposed at a position that overlaps a center point of a turn circle of the conveyance object.

<9> The conveyance object-coupling unit according to <7> above, wherein
the marking includes
a first marking provided to the brackets so as to be oriented outward of the conveyance object along the predetermined direction, and
a second marking provided to the brackets so as to be oriented inward of the conveyance object along the predetermined direction.

<10> A conveyance system, including:
an autonomous vehicle; and
a conveyance object configured to be coupled to the autonomous vehicle and conveyed by the autonomous vehicle to move, wherein
the conveyance object includes
a bottom plate;
a coupling provided on a lower surface of the bottom plate and configured to be coupled to the autonomous vehicle;
a pair of guide frames provided on the lower surface and configured to guide the autonomous vehicle so as to move to a position of the coupling from a predetermined direction; and
a pair of brackets provided to extend downward from the lower surface between the pair of guide frames and disposed on both sides of the coupling in the predetermined direction, each of the brackets being provided with a marking that faces the predetermined direction and that is recognizable by the autonomous vehicle.

<11> The conveyance system according to <10> above, wherein
the coupling is disposed at a position that overlaps a center point of a turn circle of the conveyance object.

<12> The conveyance system according to <10> above, wherein
the marking includes
a first marking provided to the brackets so as to be oriented outward of the conveyance object along the predetermined direction, and
a second marking provided to the brackets so as to be oriented inward of the conveyance object along the predetermined direction.

<13> The conveyance system according to <10> above, wherein
the guide frames of the conveyance object each include
a beam extending in the predetermined direction, and
a pair of pillars that are coupled to the lower surface at both ends of the beam, thereby hanging the beam, the conveyance object includes a plurality of wheels,
the plurality of wheels of the conveyance object are disposed outward of the four pillars of the guide frames in a facing direction of the guide frames,
the autonomous vehicle includes a laser imaging detection and ranging (LIDAR) sensor that is disposed at a height position that overlaps the pillars and is configured to detect an object in an outer circumferential direction,
the LIDAR sensor is disposed at a position that is exposed to one side in the predetermined direction with respect to the conveyance object when the autonomous vehicle is coupled to the conveyance object, and
fulcrums of some of the plurality of wheels that are disposed to be closer to the LIDAR sensor when the autonomous vehicle is coupled to the conveyance object are disposed at positions that at least partially overlap a range that is a blind spot where measurement is inhibited by the pillars in a measurement range in the outer circumferential direction of the LIDAR sensor.

<14> The conveyance system according to <10> above, wherein
the conveyance object includes a plurality of wheels,
the bottom plate of the conveyance object has an oblong shape,
at least one fulcrum of the plurality of wheels is disposed outward of both ends of a pair of facing straight lines of the oblong shape, as viewed from an upper surface of the conveyance object in a direction perpendicular to the lower surface of the conveyance object, and
the at least one fulcrum of the plurality of wheels is disposed at a position that at least partially overlaps a range of a region between the pair of straight lines, as viewed from the upper surface of the conveyance object in the direction perpendicular to the lower surface of the conveyance object.

<15> The conveyance object included in the conveyance system according to <10> above, wherein
the conveyance object includes a plurality of wheels, and
each of the plurality of wheels of the conveyance object is disposed such that a turn circle about a fulcrum of the wheel at least partially overlaps the guide frame, as viewed from an upper surface of the conveyance object in a direction perpendicular to the lower surface of the conveyance object.

What is claimed is:

1. A conveyance object, which is configured to be coupled to an autonomous vehicle and conveyed by the autonomous vehicle to move, the conveyance object comprising:
a bottom plate;
a coupling provided on a lower surface of the bottom plate and configured to be coupled to the autonomous vehicle;
a pair of guide frames provided on the lower surface and configured to guide the autonomous vehicle so as to move to a position of the coupling from a predetermined direction; and
a pair of brackets provided to extend downward from the lower surface between the pair of guide frames and disposed on both sides of the coupling in the predetermined direction, each of the brackets being provided with a marking that faces the predetermined direction and that is recognizable by the autonomous vehicle.

2. The conveyance object according to claim 1, further comprising:
a plurality of wheels, wherein
the coupling is disposed at a position that overlaps a center point of a turn circle of the conveyance object, the turn circle being defined in accordance with the plurality of wheels.

3. The conveyance object according to claim 1, wherein the marking includes
a first marking provided to the brackets so as to be oriented outward of the conveyance object along the predetermined direction, and
a second marking provided to the brackets so as to be oriented inward of the conveyance object along the predetermined direction.

4. The conveyance object according to claim 2, wherein the guide frames each include
a beam extending in the predetermined direction, and
a pair of pillars that are coupled to the lower surface at both ends of the beam, thereby hanging the beam, wherein
at least one fulcrum of the plurality of wheels is disposed outward of the guide frames in a facing direction of the guide frames, and
the at least one fulcrum of the plurality of wheels is disposed at a position that at least partially overlaps a range of a width of the pillar along the predetermined direction as viewed from a direction perpendicular to the predetermined direction.

5. The conveyance object according to claim 2, wherein the bottom plate has an oblong shape,
at least one fulcrum of the plurality of wheels is disposed outward of both ends of a pair of facing straight lines of the oblong shape, as viewed from an upper surface of the conveyance object in a direction perpendicular to the lower surface of the conveyance object, and
the at least one fulcrum of the plurality of wheels is disposed at a position that at least partially overlaps a range of a region between the pair of straight lines, as viewed from the upper surface of the conveyance object in the direction perpendicular to the lower surface of the conveyance object.

6. The conveyance object according to claim 2, wherein each of the plurality of wheels is disposed such that a turn circle about a fulcrum of the wheel at least partially overlaps the guide frame, as viewed from an upper surface of the conveyance object in a direction perpendicular to the lower surface of the conveyance object.

7. The conveyance object according to claim 1, wherein the marking includes identification information of the conveyance object.

8. The conveyance object according to claim 1, wherein the marking includes at least one of a barcode, a character, a figure, or a picture.

9. A conveyance object-coupling unit, which is configured to couple a conveyance object to an autonomous vehicle such that the conveyance object is conveyed by the autonomous vehicle to move, the conveyance object-coupling unit comprising:
a substrate configured to be disposed on a lower surface of a bottom plate of the conveyance object;
a coupling provided on the lower surface of the substrate and configured to be coupled to the autonomous vehicle;
a pair of guide frames provided on the lower surface of the substrate and configured to guide the autonomous vehicle so as to move to a position of the coupling from a predetermined direction; and a pair of brackets provided to extend downward from the lower surface between the pair of guide frames and disposed on both sides of the coupling in the predetermined direction, each of the brackets being provided with a marking that faces the predetermined direction and that is recognizable by the autonomous vehicle.

10. The conveyance object-coupling unit according to claim 9, wherein
the substrate is disposed on the bottom plate of the conveyance object such that the coupling is disposed at a position that overlaps a center point of a turn circle of the conveyance object.

11. The conveyance object-coupling unit according to claim 9, wherein
the marking includes
a first marking provided to the brackets so as to be oriented outward of the conveyance object along the predetermined direction, and
a second marking provided to the brackets so as to be oriented inward of the conveyance object along the predetermined direction.

12. The conveyance object-coupling unit according to the claim 9, wherein
the marking includes identification information of the conveyance object.

13. The conveyance object according to claim 9, wherein the marking includes at least one of a barcode, a character, a figure, or a picture.

14. A conveyance system, comprising:
an autonomous vehicle; and
a conveyance object configured to be coupled to the autonomous vehicle and conveyed by the autonomous vehicle to move, wherein
the conveyance object includes
a bottom plate;
a coupling provided on a lower surface of the bottom plate and configured to be coupled to the autonomous vehicle;
a pair of guide frames provided on the lower surface and configured to guide the autonomous vehicle so as to move to a position of the coupling from a predetermined direction; and
a pair of brackets provided to extend downward from the lower surface between the pair of guide frames and disposed on both sides of the coupling in the predetermined direction, each of the brackets being provided with a marking that faces the predetermined direction and that is recognizable by the autonomous vehicle.

15. The conveyance system according to claim 14, wherein
the coupling is disposed at a position that overlaps a center point of a turn circle of the conveyance object.

16. The conveyance system according to claim 14, wherein
the marking includes
a first marking provided to the brackets so as to be oriented outward of the conveyance object along the predetermined direction, and
a second marking provided to the brackets so as to be oriented inward of the conveyance object along the predetermined direction.

17. The conveyance system according to claim 14, wherein
the guide frames of the conveyance object each include
a beam extending in the predetermined direction, and
a pair of pillars that are coupled to the lower surface at both ends of the beam, thereby hanging the beam,
the conveyance object includes a plurality of wheels,
the plurality of wheels of the conveyance object are disposed outward of the four pillars of the guide frames in a facing direction of the guide frames,
the autonomous vehicle includes a laser imaging detection and ranging (LIDAR) sensor that is disposed at a height position that overlaps the pillars and is configured to detect an object in an outer circumferential direction,
the LIDAR sensor is disposed at a position that is exposed to one side in the predetermined direction with respect to the conveyance object when the autonomous vehicle is coupled to the conveyance object, and
fulcrums of some of the plurality of wheels that are disposed to be closer to the LIDAR sensor when the autonomous vehicle is coupled to the conveyance object are disposed at positions that at least partially overlap a range that is a blind spot where measurement is inhibited by the pillars in a measurement range in the outer circumferential direction of the LIDAR sensor.

18. The conveyance system according to claim 14, wherein
the conveyance object includes a plurality of wheels,
the bottom plate of the conveyance object has an oblong shape,
at least one fulcrum of the plurality of wheels is disposed outward of both ends of a pair of facing straight lines of the oblong shape, as viewed from an upper surface of the conveyance object in a direction perpendicular to the lower surface of the conveyance object, and
the at least one fulcrum of the plurality of wheels is disposed at a position that at least partially overlaps a range of a region between the pair of straight lines, as viewed from the upper surface of the conveyance object in the direction perpendicular to the lower surface of the conveyance object.

19. The conveyance object included in the conveyance system according to claim 14, wherein
the conveyance object includes a plurality of wheels, and
each of the plurality of wheels of the conveyance object is disposed such that a turn circle about a fulcrum of the wheel at least partially overlaps the guide frame, as viewed from an upper surface of the conveyance object in a direction perpendicular to the lower surface of the conveyance object.

20. The conveyance system according to claim 14, wherein
the marking includes identification information of the conveyance object.

* * * * *